US012757207B2

(12) United States Patent
Lei et al.

(10) Patent No.: US 12,757,207 B2
(45) Date of Patent: Oct. 6, 2026

(54) TRANSMITTING UPLINK CONTROL INFORMATION ASSOCIATED WITH A SMALL DATA TRANSMISSION OPERATION

(71) Applicant: QUALCOMM Incorporated, San Diego, CA (US)

(72) Inventors: Jing Lei, San Diego, CA (US); Renqiu Wang, San Diego, CA (US); Yeliz Tokgoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 18/494,399

(22) Filed: Oct. 25, 2023

(65) Prior Publication Data

US 2024/0260039 A1 Aug. 1, 2024

Related U.S. Application Data

(60) Provisional application No. 63/481,953, filed on Jan. 27, 2023.

(51) Int. Cl.
*H04W 72/21* (2023.01)
*H04W 68/02* (2009.01)

(52) U.S. Cl.
CPC ........... *H04W 72/21* (2023.01); *H04W 68/02* (2013.01)

(58) Field of Classification Search
None
See application file for complete search history.

(56) References Cited

U.S. PATENT DOCUMENTS

2021/0203449 A1* 7/2021 Chatterjee ............. H04L 1/1896
2022/0312502 A1* 9/2022 Kim .................. H04W 74/0866
2022/0361239 A1* 11/2022 Xu ........................ H04W 76/27
2023/0122869 A1* 4/2023 Tsai ...................... H04L 1/1812
370/329
2023/0156702 A1* 5/2023 Kim .................. H04W 72/1273
370/329

(Continued)

OTHER PUBLICATIONS

Ericsson: "MT-SDT Baseline" 3GPP TSG-RAN WG2 Meeting #120, R2-2211471, Type Discussion, NR MT_SDT-CORE, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 3, 2022, pp. 1-10, XP052215580, p. 7-p. 8.

(Continued)

*Primary Examiner* — Otis L Thompson, Jr.
(74) *Attorney, Agent, or Firm* — Harrity & Harrity, LLP

(57) ABSTRACT

Various aspects of the present disclosure generally relate to wireless communication. In some aspects, a user equipment (UE) may receive a first downlink communication associated with a small data transmission (SDT) operation, the first downlink communication indicating a dedicated physical uplink control channel (PUCCH) resource set. The UE may receive a second downlink communication during the SDT operation, the second downlink communication comprising at least one of an SDT communication or a non-SDT communication, the non-SDT communication being received during a radio resource control (RRC) inactive state associated with the UE or an RRC idle state associated with the UE. The UE may transmit, using the dedicated PUCCH resource set, uplink control information (UCI) associated with the second downlink communication. Numerous other aspects are described.

30 Claims, 10 Drawing Sheets

(56) References Cited

U.S. PATENT DOCUMENTS

| | | | | |
|---|---|---|---|---|
| 2023/0217499 | A1* | 7/2023 | Jeon | H04L 1/1835 |
| 2023/0247712 | A1* | 8/2023 | Babaei | H04L 5/0055 |
| 2024/0163868 | A1* | 5/2024 | Xiong | H04L 5/0051 |
| 2024/0260039 | A1* | 8/2024 | Lei | H04W 68/02 |
| 2024/0397572 | A1* | 11/2024 | Awad | H04W 72/23 |
| 2025/0133561 | A1* | 4/2025 | Lei | H04W 72/1268 |
| 2025/0193959 | A1* | 6/2025 | Chen | H04W 72/23 |
| 2025/0287456 | A1* | 9/2025 | Narayanan | H04W 76/28 |
| 2025/0301463 | A1* | 9/2025 | Christoffersson | H04W 74/0833 |
| 2025/0344280 | A1* | 11/2025 | Wu | H04W 76/27 |
| 2026/0059463 | A1* | 2/2026 | Myrberg | H04W 56/0045 |

OTHER PUBLICATIONS

International Search Report and Written Opinion—PCT/US2023/084059—ISA/EPO—Apr. 10, 2024.

Oppo: "Initial Considerations on MT-SDT", 3GPP TSG-RAN WG2 Meeting #120, R2-2211867, Type Discussion, NR MT_SDT-CORE, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 4, 2022, pp. 1-5, XP052215958, p. 3-p. 4.

Qualcomm Incorporated: "Discussion on MT-SDT", 3GPP TSG-RAN2 Meeting #120, R2-2212199, 3rd Generation Partnership Project, Mobile Competence Centre, 650, Route Des Lucioles, F-06921 Sophia-Antipolis Cedex, France, vol. 3GPP RAN 2, No. Toulouse, Nov. 14, 2022-Nov. 18, 2022, pp. 1-6, Nov. 4, 2022 , XP052216283, p. 3-p. 4.

VIVO: "Supporting Mobile Terminated Small Data Transmission in RRC_INACTIVE", 3GPP TSG-RAN WG2 Meeting #120, R2-2211249, Type Discussion, NR MT_SDT-CORE, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 4, 2022, 4 Pages, XP052215361, p. 1-p. 4.

* cited by examiner

TRANSMITTING UPLINK CONTROL INFORMATION ASSOCIATED WITH A SMALL DATA TRANSMISSION OPERATION

CROSS-REFERENCE TO RELATED APPLICATION

This Patent application claims priority to U.S. Provisional Patent Application No. 63/481,953, filed on Jan. 27, 2023, entitled "TRANSMITTING UPLINK CONTROL INFORMATION ASSOCIATED WITH A SMALL DATA TRANSMISSION OPERATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for transmitting uplink control information associated with a small data transmission operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include one or more memories and one or more processors coupled to the one or more memories. The one or more processors may be configured to receive a first downlink communication associated with a small data transmission (SDT) operation, the first downlink communication indicating a dedicated physical uplink control channel (PUCCH) resource set. The one or more processors may be configured to receive a second downlink communication during the SDT operation, the second downlink communication comprising at least one of an SDT communication or a non-SDT communication, the non-SDT communication being received during a radio resource control (RRC) inactive state associated with the UE or an RRC idle state associated with the UE. The one or more processors may be configured to transmit, using the dedicated PUCCH resource set, uplink control information (UCI) associated with the second downlink communication.

Some aspects described herein relate to a network node for wireless communication. The network node may include one or more memories and one or more processors coupled to the one or more memories. The one or more processors may be configured to transmit a first downlink communication associated with an SDT communication, the first downlink communication indicating a dedicated PUCCH resource set. The one or more processors may be configured to transmit a second downlink communication during the SDT operation, the second downlink communication comprising at least one of an SDT communication or a non-SDT communication, the non-SDT communication being received during an RRC inactive state associated with the UE or an RRC idle state associated with the UE. The one or more processors may be configured to receive, via the dedicated PUCCH resource set, UCI associated with the second downlink communication.

Some aspects described herein relate to a method of wireless communication performed by a UE. The method may include receiving a first downlink communication associated with an SDT operation, the first downlink communication indicating a dedicated PUCCH resource set. The method may include receiving a second downlink communication during the SDT operation, the second downlink communication comprising at least one of an SDT communication or a non-SDT communication, the non-SDT communication being received during an RRC inactive state associated with the UE or an RRC idle state associated with the UE. The method may include transmitting, using the dedicated PUCCH resource set, UCI associated with the second downlink communication.

Some aspects described herein relate to a method of wireless communication performed by a network node. The method may include transmitting a first downlink communication associated with an SDT operation, the first downlink communication indicating a dedicated PUCCH resource set. The method may include transmitting a second downlink communication during the SDT operation, the second downlink communication comprising at least one of an SDT communication or a non-SDT communication, the non-SDT communication being received during an RRC inactive state associated with the UE or an RRC idle state associated with the UE. The method may include receiving, via the dedicated PUCCH resource set, UCI associated with the second downlink communication.

Some aspects described herein relate to a non-transitory computer-readable medium that stores a set of instructions for wireless communication by a UE. The set of instructions, when executed by one or more processors of the UE, may cause the UE to receive a first downlink communication associated with an SDT operation, the first downlink communication indicating a dedicated PUCCH resource set. The set of instructions, when executed by one or more processors of the UE, may cause the UE to receive a second downlink communication during the SDT operation, the second downlink communication comprising at least one of an SDT communication or a non-SDT communication, the non-SDT communication being received during an RRC inactive state associated with the UE or an RRC idle state associated with the UE. The set of instructions, when executed by one or more processors of the UE, may cause the UE to transmit, using the dedicated PUCCH resource set, UCI associated with the second downlink communication.

Some aspects described herein relate to a non-transitory computer-readable medium that stores a set of instructions for wireless communication by a network node. The set of instructions, when executed by one or more processors of the network node, may cause the network node to transmit a first downlink communication associated with an SDT operation, the first downlink communication indicating a dedicated PUCCH resource set. The set of instructions, when executed by one or more processors of the network node, may cause the network node to transmit a second downlink communication during the SDT operation, the second downlink communication comprising at least one of an SDT communication or a non-SDT communication, the non-SDT communication being received during an RRC inactive state associated with the UE or an RRC idle state associated with the UE. The set of instructions, when executed by one or more processors of the network node, may cause the network node to receive, via the dedicated PUCCH resource set, UCI associated with the second downlink communication.

Some aspects described herein relate to an apparatus for wireless communication. The apparatus may include means for receiving a first downlink communication associated with an SDT operation, the first downlink communication indicating a dedicated PUCCH resource set. The apparatus may include means for receiving a second downlink communication during the SDT operation, the second downlink communication comprising at least one of an SDT communication or a non-SDT communication, the non-SDT communication being received during an RRC inactive state associated with the apparatus or an RRC idle state associated with the apparatus. The apparatus may include means for transmitting, using the dedicated PUCCH resource set, UCI associated with the second downlink communication.

Some aspects described herein relate to an apparatus for wireless communication. The apparatus may include means for transmitting, to a UE, a first downlink communication associated with an SDT communication, the first downlink communication indicating a dedicated PUCCH resource set. The apparatus may include means for transmitting a second downlink communication during the SDT operation, the second downlink communication comprising at least one of an SDT communication or a non-SDT communication, the non-SDT communication being received during an RRC inactive state associated with the UE or an RRC idle state associated with the UE. The apparatus may include means for receiving, via the dedicated PUCCH resource set, UCI associated with the second downlink communication.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
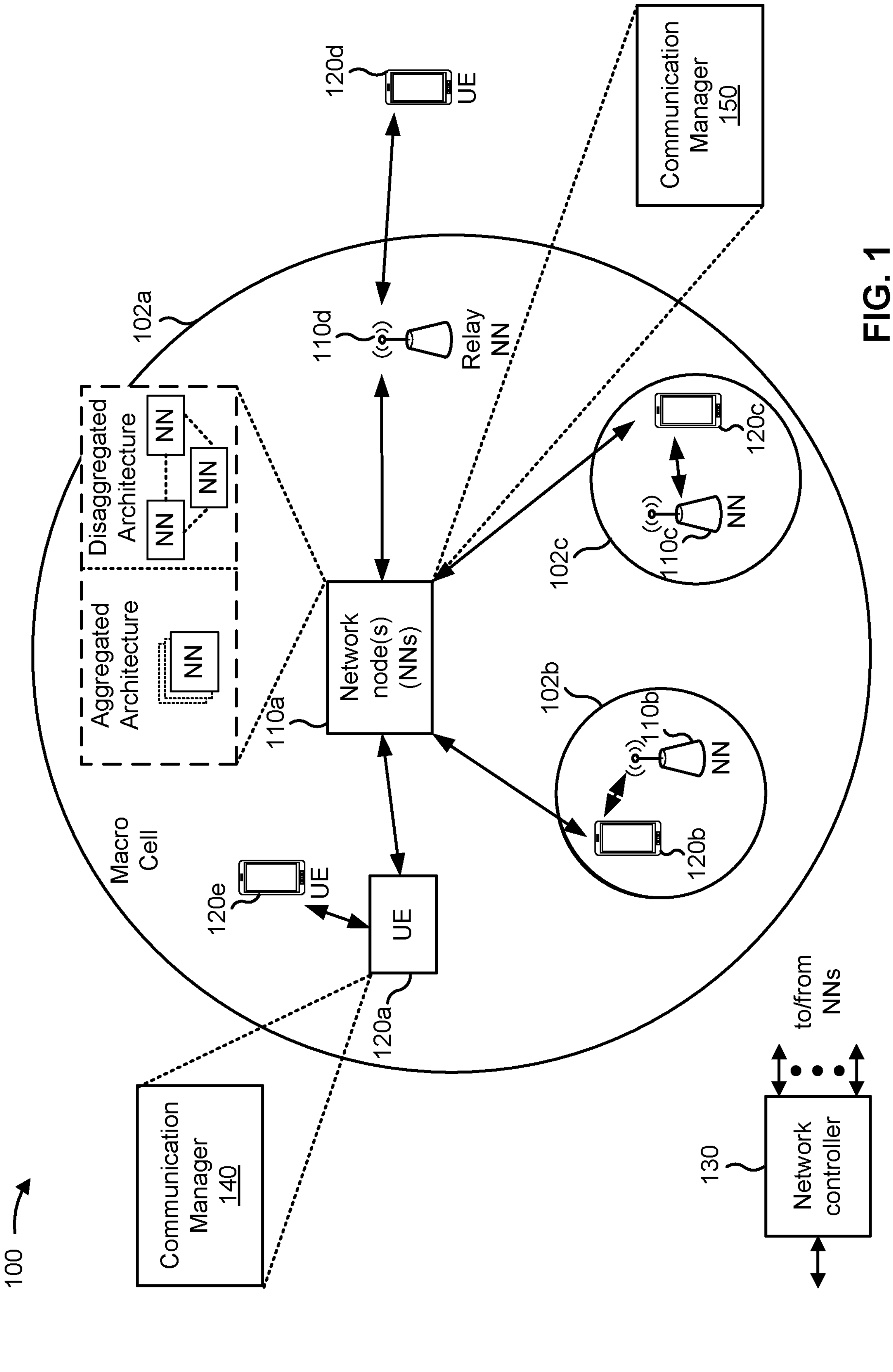
FIG. 1 is a diagram illustrating an example of a wireless network, in accordance with the present disclosure.

In a wireless network, such as a New Radio (NR) network, a user equipment (UE) may transmit uplink data using an uplink resource that was previously configured by a network (e.g., by a network node 110). In an NR network, the previously configured uplink resource may be referred to as a configured grant (CG) small data transmission (SDT) (CG-SDT), which may be applicable to a UE in an RRC inactive or idle state, associated with a beam-specific resource configuration, and associated with beam-specific feedback with a downlink reference signal. In some aspects, a network node may configure a CG-SDT for a UE while the UE is in an RRC connected state, when transmitting a radio resource control (RRC) release message to the UE, and/or in a downlink message associated with a random access channel (RACH) procedure, among other examples. In some aspects, a CG-SDT may be configured as a dedicated CG-SDT and/or a contention-free dedicated CG-SDT, a contention-free shared CG-SDT, and/or a contention-based shared CG-SDT, among other examples.

In accordance with some wireless communication standards, a network node can allow a UE to transmit uplink small data in an RRC inactive state without the UE first having to move to an RRC connected state. The uplink transmission may be referred to as a mobile originated SDT (MO-SDT). In some cases, MO-SDT can be transmitted as part of a RACH based SDT procedure. In some other cases, MO-SDT can be transmitted as part of a CG-SDT procedure. In some cases, a network node can support MT-SDT. In some cases, for example, MT-SDT can be triggered by a paging indication sent from the network (e.g., the network node) to the UE. However, if the UE does not have a dedicated physical uplink control channel (PUCCH) resource set, the UE can be unable to send various types of information via uplink control information (UCI). For example, without a dedicated PUCCH resource set, the UE can be unable to transmit a scheduling request (SR), channel state information (CSI) and/or a link recovery request (LRR) via UCI, which may inhibit link adaptation and subsequent transmission of SDT information, non-SDT information, and/or control information during an MT-SDT operation, thereby negatively impacting network and/or device performance.

Some aspects of the techniques and apparatuses described herein may provide UCI resource configuration and transmission procedures to support MT-SDT operations. For example, in some aspects, a UE may receive a downlink communication that includes configuration information that configures a dedicated PUCCH resource set associated with an MT-SDT communication and/or an activation communication that activates the dedicated PUCCH resource set. The UE may transmit, using the dedicated PUCCH resource set, UCI associated with the MT-SDT communication. In this way, some aspects may facilitate transmission of various types of information via UCI during an MT-SDT operation, thereby facilitating link adaptation and subsequent transmission of SDT information, non-SDT information, and/or control information during an MT-SDT operation. Accordingly, some aspects may improve latency, reliability and power efficiency for MT-SDT operations, thereby positively impacting network and/or device performance.

Various aspects of the disclosure are described more fully hereinafter with reference to the accompanying drawings. This disclosure may however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In some aspects, UEs may be classified according to different categories and/or may support different capabilities. For example, a network node may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category, and may be referred to as a reduced capacity (RedCap) UE (which may be interchangeably referred to as a reduced capability UE, also having the acronym "RedCap"), a low tier UE, and/or an NR-Lite UE, among other examples. A UE of the second category may be an ultra-reliable low-latency communication (URLLC) devices and/or an enhanced mobile broadband (eMBB) device and may have an advanced feature set compared to RedCap UEs. RedCap UEs may include wearable devices, Internet of Things (IoT) devices, sensors, cameras, and/or the like that are associated with a limited bandwidth, power capacity, and/or transmission range, among other examples. A UE of the second category may be referred to as a legacy UE, a baseline UE, a high tier UE, an NR UE, and/or a premium UE, among other examples. In some aspects, a RedCap UE may have capabilities that satisfy requirements of a first wireless communication standard but not a second wireless communication standard, while a UE of the second category may have capabilities that satisfy requirements of the second wireless communication standard (and also the first wireless communication standard, in some cases).

For example, a RedCap UE of the first category may support a lower maximum modulation and coding scheme (MCS) than a UE of the second category (e.g., quadrature phase shift keying (QPSK) or the like as compared to 256-quadrature amplitude modulation (QAM) or the like), may support a lower maximum transmit power than a UE of the second category, may have a less advanced beamforming capability than a UE of the second category (e.g., may not be capable of forming as many beams as a UE of the second category), may require a longer processing time than a UE of the second category, may include less hardware than a UE of the second category (e.g., fewer antennas, fewer transmit antennas, and/or fewer receive antennas), and/or may not be capable of communicating on as wide of a maximum bandwidth part as a UE of the second category, among other examples.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may receive a first downlink communication associated with a small data transmission (SDT) communication, the first downlink communication indicating a dedicated physical uplink control channel (PUCCH) resource set; receive a second downlink communication during the SDT operation, the second downlink communication comprising at least one of an SDT communication or a non-SDT communication, the non-SDT communication being received during a radio resource control (RRC) inactive state associated with the UE or an RRC idle state associated with the UE; and transmit, using the dedicated PUCCH resource set, uplink control information (UCI) associated with the second downlink communication. Additionally, or alternatively, the communication manager 140 may perform one or more other operations described herein.

In some aspects, a network node (e.g., the network node 110) may include a communication manager 150. As described in more detail elsewhere herein, the communication manager 150 may transmit a first downlink communication associated with an SDT communication, the first downlink communication indicating a dedicated PUCCH resource set; transmit a second downlink communication during the SDT operation, the second downlink communication comprising at least one of an SDT communication or a non-SDT communication, the non-SDT communication being received during an RRC inactive state associated with the UE or an RRC idle state associated with the UE; and receive, via the dedicated PUCCH resource set, UCI associated with the MT-SDT communication. Additionally, or alternatively, the communication manager 150 may perform one or more other operations described herein.

As indicated above, FIG. 1 is provided as an example. Other examples may differ from what is described with regard to FIG. 1.

Figure 2:
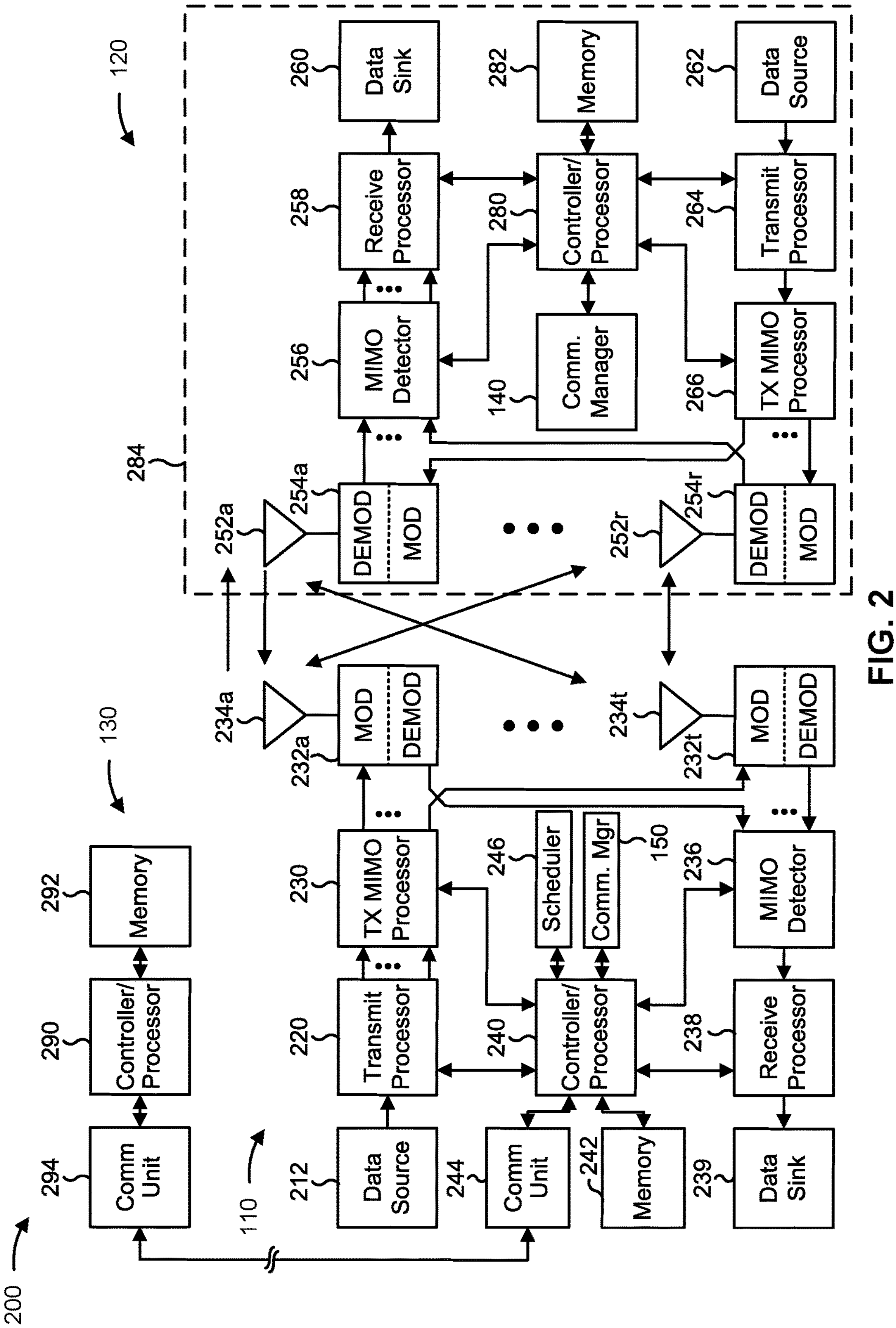
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more MCSs for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the network node 110, the controller/processor 280 of the UE 120, and/or any other component(s) of FIG. 2 may perform one or more techniques associated with transmitting UCI associated with a small data transmission (SDT) operation, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving a first downlink communication associated with an SDT operation, the first downlink communication indicating a dedicated PUCCH resource set; means for receiving a second downlink communication during the SDT operation, the second downlink communication comprising at least one of an SDT communication or a non-SDT communication, the non-SDT communication being received during an RRC inactive state associated with the UE or an RRC idle state associated with the UE; and/or means for transmitting, using the dedicated PUCCH resource set, UCI associated with the second downlink communication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting a first downlink communication associated with an SDT operation, the first downlink communication indicating a dedicated PUCCH resource set; means for transmitting a second downlink communication during the SDT operation, the second downlink communication comprising at least one of an SDT communication or a non-SDT communication, the non-SDT communication being received during an RRC inactive state associated with the UE or an RRC idle state associated with the UE; and/or means for receiving, via the dedicated PUCCH resource set, UCI associated with the second downlink communication. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
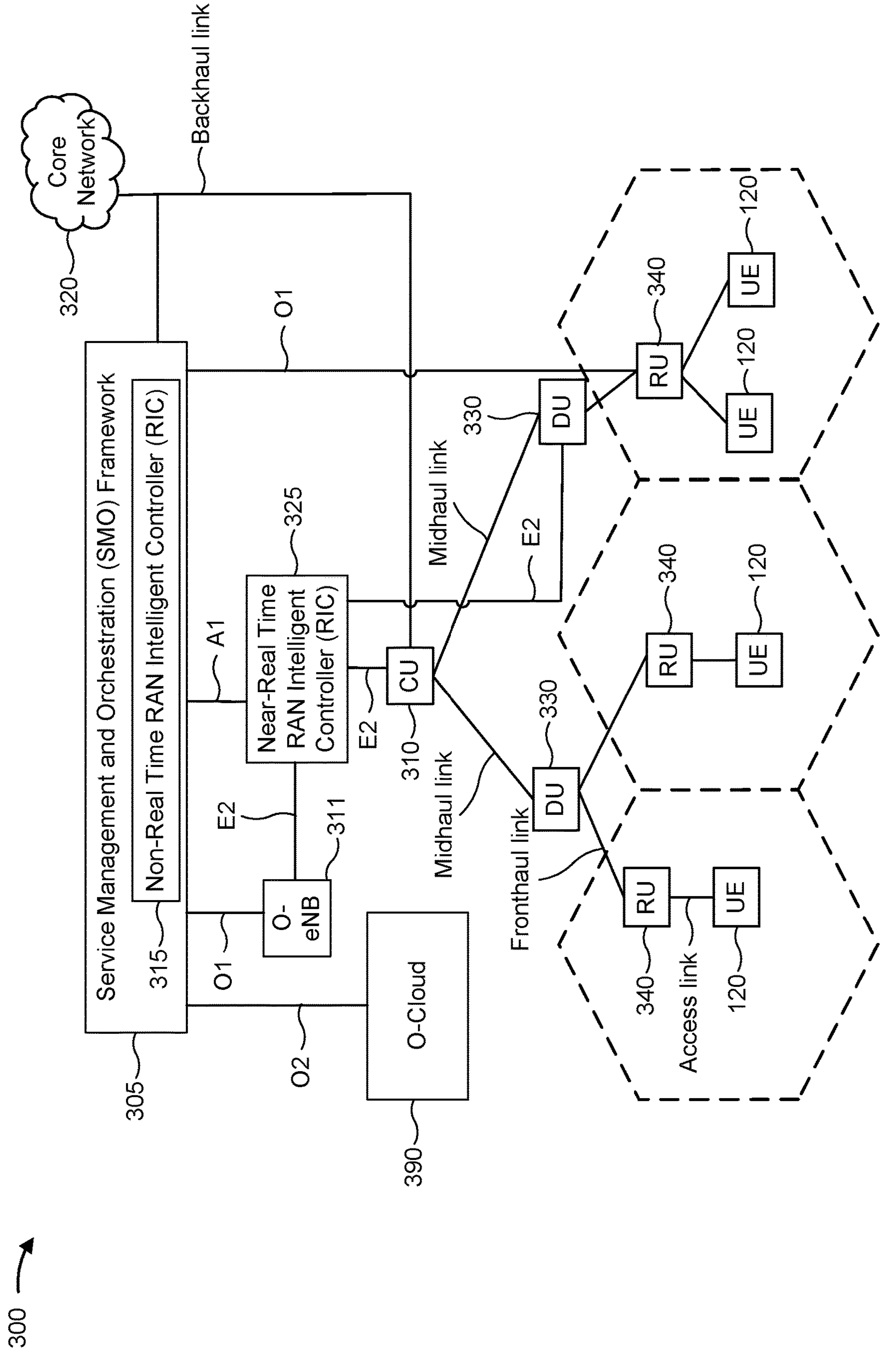
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective RF access links.

In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4A:
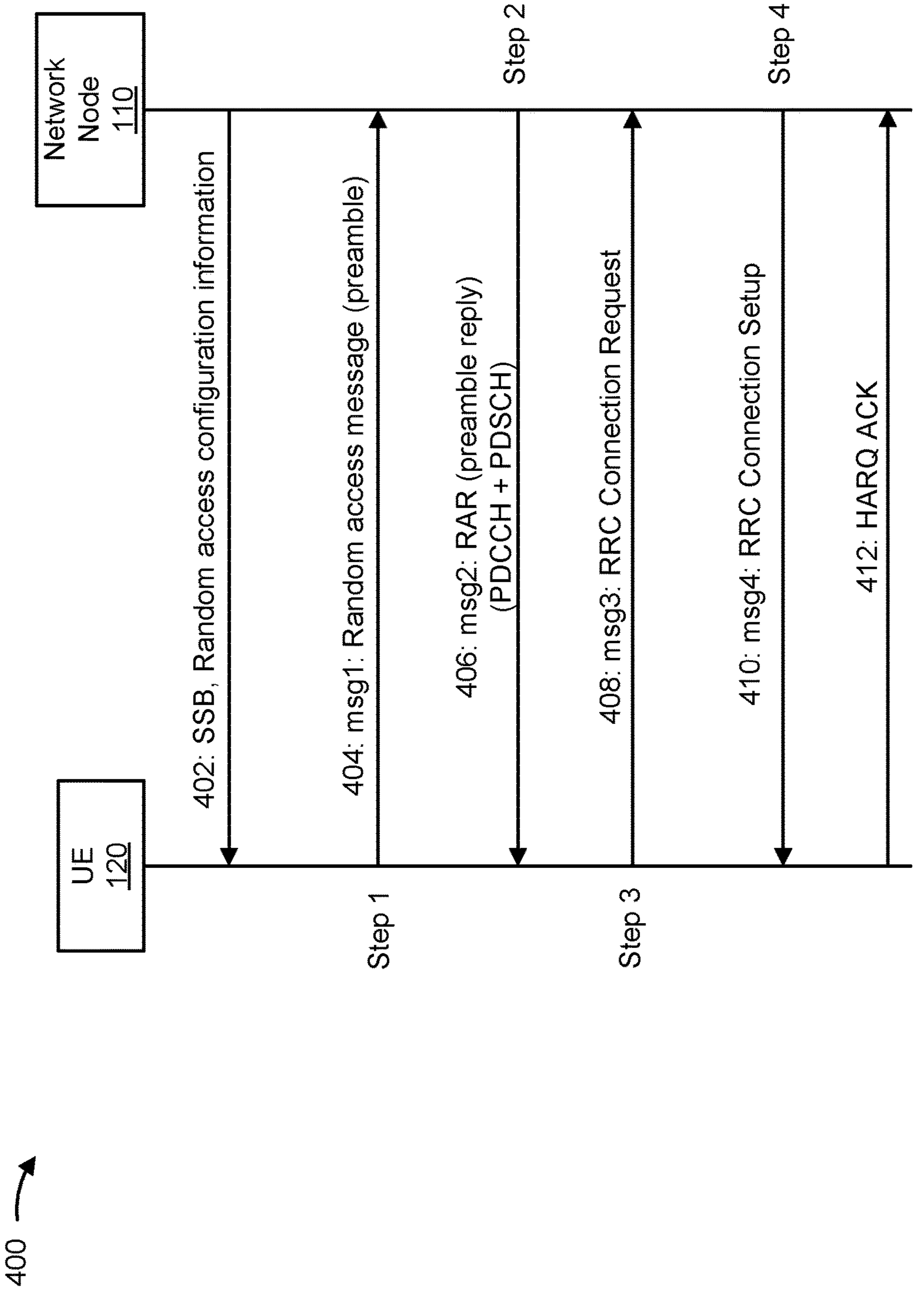
FIG. 4A is a diagram illustrating an example of a four-step random access procedure, in accordance with the present disclosure.

FIG. 4A is a diagram illustrating an example 400 of a four-step random access procedure, in accordance with the present disclosure. As shown in FIG. 4A, a network node 110 and a UE 120 may communicate with one another to perform the four-step random access procedure (which may be referred to as a "Type-1 random access procedure").

As shown by reference number 402, the network node 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in an RRC message and/or a physical downlink control channel (PDCCH) order message that triggers a random access channel (RACH) procedure, such as for contention-free random access. The random access configuration information may include one or more parameters to be used in the random access procedure, such as one or more parameters for transmitting a random access message (RAM) and/or one or more parameters for receiving a random access response (RAR).

As shown by reference number 404, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, a RACH transmission, a PRACH transmission, or an initial message in a four-step random access procedure. The random access message may include a random access preamble identifier.

As shown by reference number 406, the network node 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the network node 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also, as part of the second step of the four-step random access procedure, the network node 110 may transmit the PDSCH communication for the RAR, as scheduled by the PDCCH communication. The RAR may be included in a MAC protocol data unit (PDU) of the PDSCH communication.

As shown by reference number 408, the UE 120 may transmit an RRC connection request message. The RRC connection request message may be referred to as message 3, msg3, MSG3, or a third message of a four-step random access procedure. In some aspects, the RRC connection request may include a UE identifier, UCI, and/or a physical uplink shared channel (PUSCH) communication (e.g., an RRC connection request).

As shown by reference number 410, the network node 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 412, if the UE 120 successfully receives the RRC connection setup message, the UE 120 may transmit a hybrid automatic repeat request (HARQ) acknowledgement (ACK).

As indicated above, FIG. 4A is provided as an example. Other examples may differ from what is described with regard to FIG. 4A. In some aspects, other examples may use a two-step random access procedure.

Figure 4B:
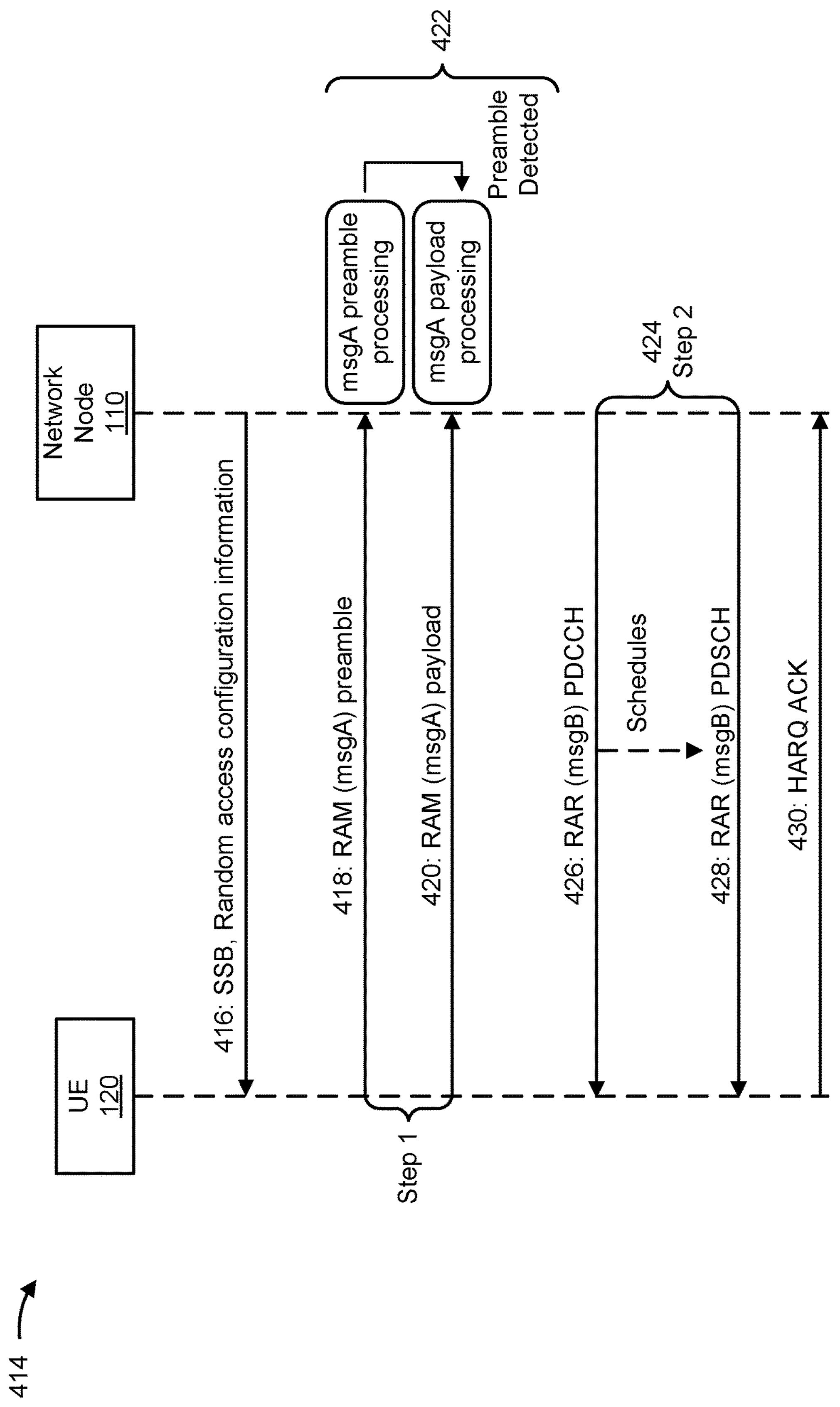
FIG. 4B is a diagram illustrating an example of a two-step random access procedure, in accordance with the present disclosure.

FIG. 4B is a diagram illustrating an example 414 of a two-step random access procedure, in accordance with the present disclosure. As shown in FIG. 4, a network node 110 and a UE 120 may communicate with one another to perform the two-step random access procedure (which may be referred to as a "Type-2 random access procedure").

As shown by reference number 416, the network node 110 may transmit, and the UE 120 may receive, one or more SSBs and random access configuration information. In some aspects, the random access configuration information may be transmitted in and/or indicated by system information (e.g., in one or more SIBs) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the two-step random access procedure, such as one or more parameters for transmitting a RAM, and/or a RAR to the RAM.

As shown by reference number 418, the UE 120 may transmit, and the network node 110 may receive, a RAM preamble. As shown by reference number 420, the UE 120 may transmit, and the network node 110 may receive, a RAM payload. As shown, the UE 120 may transmit the RAM preamble and the RAM payload to the network node 110 as part of an initial (or first) step of the two-step random access procedure. In some aspects, the RAM may be referred to as message A, msgA, a first message, and/or an initial message in a two-step random access procedure. Furthermore, in some aspects, the RAM preamble may be referred to as a message A preamble, a msgA preamble, a preamble, and/or a PRACH preamble, and the RAM payload may be referred to as a message A payload, a msgA payload, and/or a payload. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, UCI, and/or a PUSCH transmission).

As shown by reference number 422, the network node 110 may receive the RAM preamble transmitted by the UE 120. If the network node 110 successfully receives and decodes the RAM preamble, the network node 110 may then receive and decode the RAM payload.

As shown by reference number 424, the network node 110 may transmit an RAR (sometimes referred to as an RAR message). As shown, the network node 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information.

As shown by reference number 426, as part of the second step of the two-step random access procedure, the network node 110 may transmit a PDCCH communication for the RAR. The PDCCH communication may schedule a PDSCH communication that includes the RAR. For example, the PDCCH communication may indicate a resource allocation (e.g., in downlink control information (DCI)) for the PDSCH communication.

As shown by reference number 428, as part of the second step of the two-step random access procedure, the network node 110 may transmit the PDSCH communication for the RAR, as scheduled by the PDCCH communication. The RAR may be included in an MAC PDU of the PDSCH communication. As shown by reference number 430, if the UE 120 successfully receives the RAR, the UE 120 may transmit a HARQ ACK.

As indicated above, FIG. 4B is provided as an example. Other examples may differ from what is described with regard to FIG. 4B.

In a wireless network, such as an NR network or an LTE network, a UE may transmit uplink data using an uplink resource that was previously configured by a network (e.g., by a network node 110). For example, in an LTE network, the previously configured uplink resource may be referred to as a preconfigured uplink resource (PUR), which can generally be used to support a one-step uplink access procedure for connected mode or idle mode UEs with a valid timing advance (e.g., stationary or low-mobility UEs). Accordingly, a PUR may allow a UE in an RRC idle state to transmit uplink data (e.g., control plane data and/or user plane data) in a first message between the UE and the network node, thereby enabling grant-free uplink data transmission, which improves uplink transmission efficiency and/or power consumption, among other examples. Furthermore, in an NR network, the previously configured uplink resource may be referred to as a configured grant (CG) small data transfer (CG-SDT), which may be applicable to a UE in an RRC inactive or idle state, associated with a beam-specific resource configuration, and associated with beam-specific feedback (e.g., a PDCCH and/or a PDSCH that is quasi co-located (QCLed) with a downlink reference signal, such as an SSB or tracking reference signal (TRS)). The use of a PUR and/or a CG-SDT may be particularly useful for MTC UEs, IoT UEs, and/or RedCap UEs that may have relaxed peak throughput, latency, reliability, and/or other requirements relative to premium or reference UEs (e.g., by allowing a grant-free uplink transmission to occur while the UE is in an RRC idle state, an RRC inactive state, and/or another power-saving state). Although some aspects described herein relate to CG-SDT response transmission and/or uplink priority handling, it will be appreciated that the same or similar techniques may be used for PUR response transmission and/or uplink priority handling. Similarly, aspects related to PUR response transmission and/or uplink priority handling may be used for CG-SDT response transmission and/or uplink priority handling.

In some aspects, a network node may configure a CG-SDT for a UE while the UE is in an RRC connected state, when transmitting an RRC release message to the UE, and/or in a downlink message associated with a RACH procedure, among other examples. In some aspects, a CG-SDT may be configured as a dedicated CG-SDT and/or a contention-free dedicated CG-SDT, a contention-free shared CG-SDT, and/or a contention-based shared CG-SDT, among other examples.

In accordance with some wireless communication standards, a network node can allow a UE to transmit uplink small data in an RRC inactive state without the UE first having to move to an RRC connected state. The uplink transmission may be referred to as a mobile originated SDT (MO-SDT). In some cases, MO-SDT can be transmitted as part of a RACH based SDT procedure. In some other cases, MO-SDT can be transmitted as part of a CG-SDT procedure. In some cases, a network node can support MT-SDT. In some cases, for example, MT-SDT can be triggered by a paging indication sent from the network (e.g., the network node) to the UE. After the UE receives the paging indication for MT-SDT, the UE can respond with an RRC resume request message including the UE ID and one or more RRC resume causes. The RRC resume request message can be transmitted by the UE on a valid PUSCH resource and with a valid timing advance. If downlink data arrives for a UE not in the RRC connected state, the network node can page the UE to initiate an MT-SDT operation. In some cases, the UE can be paged by multiple cells, and can select a suitable cell from which to receive MT-SDT data.

Before receiving MT-SDT data from the suitable cell, the UE can send an RRC resume request for MT-SDT, which can serve as an implicit ACK for receiving the paging indication for MT-SDT. Depending on the status of uplink timing alignment and the availability of valid UL resources, the UE can send the RRC resume request via different procedures. Once MT-SDT is initiated, the network node can schedule subsequent downlink and/or uplink data for the UE without switching to connected state to enable power saving, latency reduction and signaling overhead reduction. However, if the UE does not have a dedicated PUCCH resource set, the UE can be unable to send various types of information via UCI. In many cases, a UE may only be configured with a dedicated PUCCH resource set in RRC connected state. For example, without a dedicated PUCCH resource set, the UE can be unable to transmit a scheduling request (SR), channel state information (CSI) and/or a link recovery request (LRR) via UCI, which may inhibit link adaptation and subsequent transmission of SDT information, non-SDT information, and/or control information during an MT-SDT operation, thereby negatively impacting network and/or device performance.

Some aspects of the techniques and apparatuses described herein may provide UCI resource configuration and transmission procedures to support SDT operations. For example, in some aspects, a UE may receive a first downlink communication that includes configuration information that configures a dedicated PUCCH resource set associated with an SDT operation and/or an activation communication that activates the dedicated PUCCH resource set. The UE may transmit, using the dedicated PUCCH resource set, UCI associated with a second downlink communication. The second downlink communication may be an MT-SDT communication or a non-SDT communication received while the UE is in an RRC inactive state or an RRC idle state. In this way, some aspects may facilitate transmission of various types of information via UCI during an SDT operation, thereby facilitating link adaptation and subsequent transmission of SDT information, non-SDT information, and/or control information during an SDT operation. Accordingly, some aspects may improve latency, reliability and power efficiency for SDT operations, thereby positively impacting network and/or device performance.

Some aspects may provide configuration and/or activation information indicating contents of UCI with dedicated PUCCH resources, coverage enhancements for UCI, and multiplexing of UCI with PUSCH communications. Some aspects may include UCI resource configurations for a UE, if the UE does not have valid timing advance information or valid PUSCH resource to transmit an RRC resume request for an MT-SDT operation. For example, in some aspects, the UE may perform a random access procedure and/or a random access SDT (RA-SDT) procedure to establish a valid timing advance and to obtain valid PUSCH resources. In some aspects, the UCI resource configuration may include two phases: (1) common PUCCH resource configuration (by system information) for HARQ feedback to a contention resolution message of a contention based random access (CBRA) procedure, and (2) dedicated PUCCH resource configuration (by RRC signaling or MAC control element (MAC CE)) to enable UCI enhancements associated with MT-SDT operations. Some aspects may include UCI resource configuration for a UE, if the UE has a valid timing advance and valid PUSCH resources for transmitting an RRC resume request associated with an MT-SDT communication. For example, in some aspects, the UE may have initiated a random access procedure or RA-SDT procedure before receiving a paging indication for MT-SDT communications and, in some other aspects, the UE may be configured with CG-SDT resources by an RRC release message before receiving the paging indication for MT-SDT communications.

Figure 5:
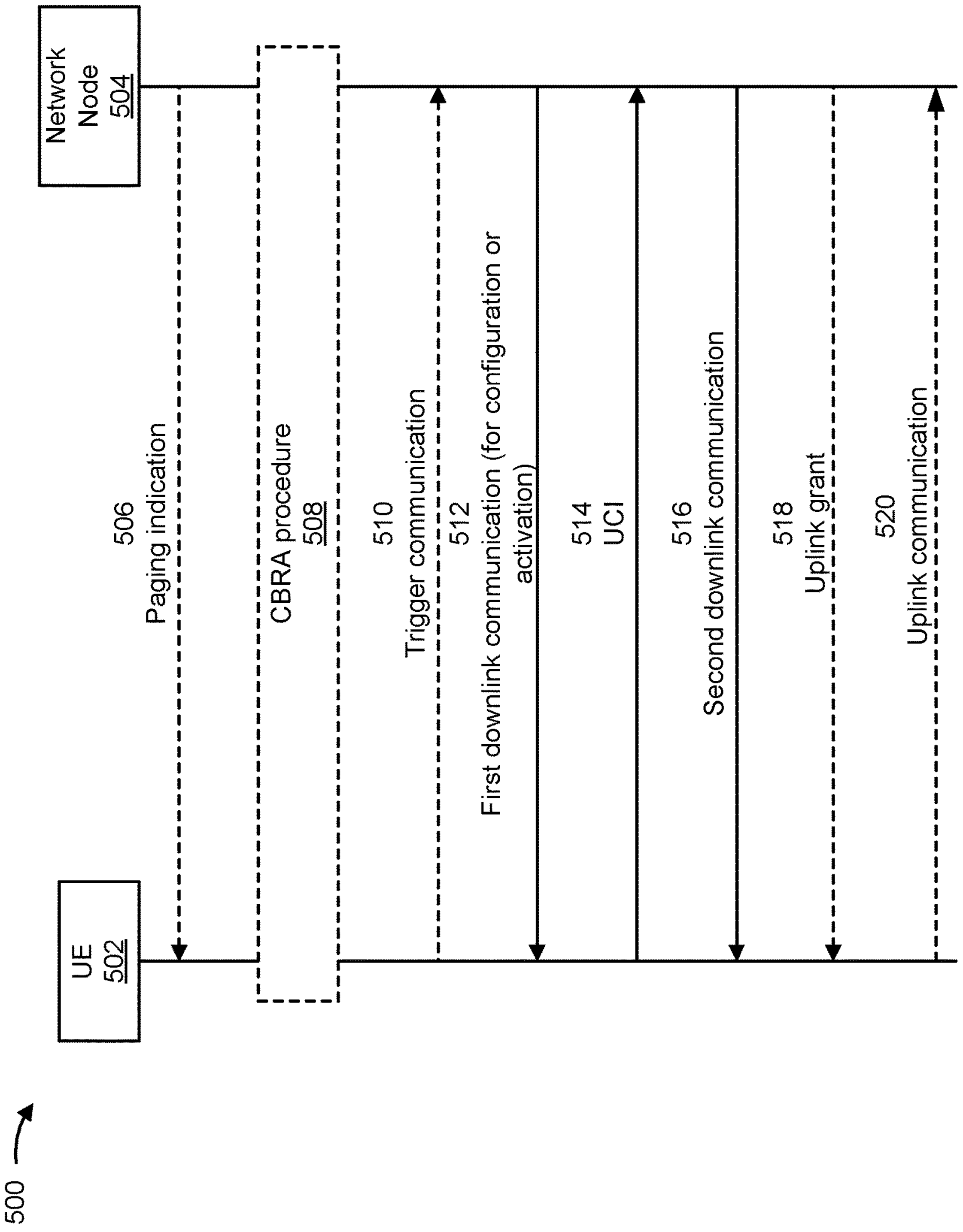
FIG. 5 is a diagram of an example associated with transmitting uplink control information (UCI) associated with a small data transmission (SDT) operation, in accordance with the present disclosure.

FIG. 5 is a diagram of an example 500 associated with transmitting UCI associated with an SDT operation, in accordance with the present disclosure. As shown in FIG. 5, a UE 502 and a network node 504 may communicate with one another. In some aspects, the UE 502 and the network node 504 may be part of a wireless network (e.g., wireless network 100). In some aspects, actions described as being performed by the network node 504 may be performed by multiple different network nodes. For example, configuration actions may be performed by a first network node (e.g., a CU and/or a DU), and radio communication actions may be performed by a second network node (e.g., a DU and/or an RU). In some aspects, the UE 502 may be, be similar to, include, or be included in, the UE 120 depicted in FIGS. 1-4B. In some aspects, the network node 504 may be, be similar to, include, or be included in, the network node 110 depicted in FIGS. 1, 2, 4A, and 4B, and/or one or more components of the disaggregated base station architecture 300 depicted in FIG. 3.

As shown by reference number 506, in some aspects, the network node 504 may transmit, and the UE 502 may receive, a paging indication. In some aspects, the paging indication may be associated with an MT-SDT operation.

In some aspects, the UE may lack (e.g., may not be configured with) at least one of a valid PUSCH configuration and/or a valid timing advance (TA). As a result, in some aspects, as shown by reference number 508, the UE 502 may perform a CBRA procedure. For example, in some aspects, the network node 504 may be associated with a cell and may transmit the paging indication via the cell. The UE 502 may perform the CBRA procedure based on receiving the paging indication. In some aspects, the network node 504 may transmit, and the UE 502 may receive, system information (SI) indicating a common PUCCH resource set associated with the CBRA procedure.

In some aspects, the common PUCCH resource set may include at least one of a RedCap resource set or a non-RedCap resource set based on a first initial uplink bandwidth part (BWP) and a second initial BWP being separately configured. In some aspects, the first initial BWP may correspond to a RedCap UE type and the second initial uplink BWP may correspond to a non-RedCap UE type. In some aspects, the common PUCCH resource set may include the RedCap resource set and the UE 502 may be a RedCap UE being separately configured with an initial uplink RedCap bandwidth part. As a result, the SI may further indicate at least one of an intra-slot frequency hopping configuration or a RedCap-specific physical resource block (PRB) offset.

For example, if the UE 502 receives a paging indication associated with an MT-SDT communication from a suitable cell but does not have valid PUSCH resources and/or a valid TA (e.g., the TA timer is stopped, not started, or expired), to transmit uplink data and/or control information including an RRC resume request, the UE 502 may initiate a CBRA procedure on the suitable cell. The CBRA procedure may include a 4-step RACH procedure or a 2-step RACH procedure. In some aspects, the UE 502 may transmit an RRC resume request for MT-SDT operations in a msg3 (4-step random access (RA)) or a msgA (2-step RA), and may further transmit HARQ feedback (ACK or negative ACK (NACK)) for a msg4 (4-step RA) or a msgB (2-step RA) using a PUCCH resource set provided by pucch-ResourceCommon and/or pucch-ResourceCommon(e)RedCap in SI.

For an enhanced RedCap ((e)RedCap) UE type configured with initialUplinkBWP-(e)RedCap, additional information for PUCCH including intra-SlotFH and additionalPRBOffset may be provided in SI targeting the (e)RedCap UE type. If both the UE 502 and the selected cell support MO-SDT and non-SDT data and/or control information on uplink and/or downlink (e.g., UE assistance information (UAI) on uplink, multicast control channel (MCCH) on downlink, and/or multicast traffic channel (MTCH) on downlink), the UE 502 may be configured with a dedicated PUCCH resource set by the serving cell selected for MT-SDT, after the RRC resume request (transmitted on PUSCH) and HARQ-ACK for msg4 or msgB are received by the network node 504.

For example, in some aspects, if a UE 502 receives a paging indication for MT-SDT operations from a suitable cell and has valid PUSCH resources and valid TA to transmit uplink data and/or control information, the UE 502 may transmit an RRC resume request for SDT (MT, or MT+MO) on valid PUSCH resources when the TA timer is running. In a first case, for example, if the UE 502 is performing a CBRA (not triggered by MT-SDT) procedure or an RA-based procedure (e.g., RA-SDT, positioning) but has not transmitted msg3/msgA yet (e.g., UE is ready to perform SDT based on 4-step RA, and has received RAR/DCI for msg3 transmission and/or retransmission), the UE 502 may adopt one or more of the following options based on the priority of the SDT procedure or the size of the uplink resource allocated by an RAR and/or DCI.

In a first option (Option 1), the UE 502 may multiplex multiple RRC resume causes and a UE ID with an RRC message (e.g., an RRC resume request for RA-SDT and MT-SDT), which may be transmitted alone or multiplexed with a buffer status report (BSR) and/or UAI, using valid PUSCH resources for msg3 (scheduled by RAR and/or DCI) or msgA (configured by SI). In some aspects, after the network node 504 (e.g., via a serving cell for SDT) receives HARQ ACK for contention resolution in msg4/msgB, the RRC resume request, BSR, or UAI may trigger the network node 504 to transmit downlink data for MT-SDT and allocate extra PUSCH resources for the subsequent uplink data and/or control information (associated with RA-SDT, MT-SDT, or non-SDT), and/or to allocate dedicated PUCCH resources to enable UCI enhancements for MT-SDT.

In a second option (Option 2), the UE 502 may prioritize the transmission of a UE ID and one of the RRC resume causes in an RRC message (e.g., an RRC resume request for MT-SDT), which may be transmitted alone or multiplexed with a BSR and/or UAI, using valid PUSCH resources (e.g., msg3 or msgA) provided by an RAR, DCI, and/or SI. After the network node 504 (via the serving cell for SDT) receives HARQ ACK for contention resolution in msg4/msgB, the RRC resume request, the BSR, or the UAI may trigger the network node 504 to transmit downlink data for MT-SDT and allocate extra PUSCH resources for the remaining RRC message (e.g., an RRC resume cause for RA-SDT) and subsequent uplink data and/or control information (associated with RA-SDT, MT-SDT or non-SDT), and/or to allocate dedicated PUCCH resources to enable UCI enhancements for MT-SDT.

In a third option (Option 3), the UE 502 may prioritize a transmission for a light-weight RRC message containing a UE ID (e.g., a common control channel (CCCH) only without resumeCause), which is transmitted alone or multiplexed with a BSR and/or UAI, using valid PUSCH resources provided by an RAR, DCI, and/or SI. After the network node 504 (via the serving cell for SDT) receives HARQ ACK for contention resolution in msg4/msgB, an RRC message containing a UE ID, BSR, or UAI may trigger the network node 504 to transmit downlink data for MT-SDT and allocate extra PUSCH resources for the remaining RRC messages (e.g., an RRC resume cause for MT-SDT) and subsequent uplink data and/or control information (associated with RA-SDT, MT-SDT or non-SDT), and/or to allocate dedicated PUCCH resources to enable UCI enhancements for MT-SDT.

In another case, if the UE 502 is configured with CG-SDT but has not transmitted an RRC resume cause for CG-SDT yet, the UE 502 may choose one of the following options, based on the priority of the SDT procedure or the size of the CG PUSCH resources. In a first option (Option 1), for example, the UE 502 may multiplex multiple RRC resume causes and a UE ID in an RRC message (e.g., an RRC resume request for CG-SDT and MT-SDT), which may be transmitted on valid CG PUSCH resources configured (by an RRC release message) for initial CG-SDT transmission. In a second option (Option 2), the UE 502 may prioritize the transmission for a UE ID and one of the RRC resume causes in an RRC message (e.g., an RRC resume request for MT-SDT), which may be transmitted on valid CG PUSCH resources configured (by an RRC release message) for initial CG-SDT transmission. For both option 1 and option 2, the initial CG-SDT transmission containing RRC resume cause(s) and UE ID may trigger the network node 504 to transmit downlink data for MT-SDT (based on DCI scheduled by a cell radio network temporary identifier (C-RNTI) or a configured scheduling radio network temporary identifier (CS-RNTI) in common or UE specific search space sets), and/or to allocate dedicated PUCCH resources to enable UCI enhancements for MT-SDT. For both option 1 and option 2, the RRC resume request may be transmitted alone or multiplexed with a BSR and/or UAI.

In some aspects, the RRC resume request, BSR, or UAI transmitted by the UE 502 also may trigger the network node 504 to issue an uplink grant (e.g., DCI scheduled by C-RNTI or CS-RNTI in common or UE specific search space sets of an initial downlink BWP) so that the UE 502 can transmit and/or re-transmit uplink control information and/or data information associated with CG-SDT, MT-SDT or non-SDT on dynamically scheduled PUSCH resources without waiting for the next valid CG PUSCH occasion. In some aspects, if the UE 502 receives a PDCCH and/or a PDSCH scheduled by C-RNTI or CS-RNTI after transmitting the RRC resume request, but does not receive an uplink grant before the next valid CG PUSCH occasion, the UE 502 may transmit the remaining uplink control and/or data information associated with CG-SDT, MT-SDT, or non-SDT on the valid CG PUSCH resources, or the UE 502 may send an SR for an uplink grant using a dedicated PUCCH resource. In this way, some aspects, may reduce latency and improve reliability.

As shown by reference number 510, the UE 502 may transmit, and the network node 504 may receive, a trigger communication. The trigger communication may be a communication that triggers (e.g., causes) the network node 504 to respond with a downlink communication indicative of a dedicated PUCCH resource set. In some aspects, the UE 502 may transmit the trigger communication based on being configured with a set of valid PUSCH resources and a valid TA.

In some aspects, the trigger communication may include an RRC resume request, a UE ID, HARQ feedback information responsive to a contention resolution of a CBRA procedure, a BSR, and/or UAI, among other examples. In some aspects, the RRC resume request may be associated with an SDT operation, such as the MT-SDT operation or an MO-SDT operation. In some aspects, the UE 502 may multiplex the RRC resume request and/or the UE ID with an uplink communication. The uplink communication may include, for example, an RRC message or a MAC CE carrying additional data and control information. In some aspects, multiplexing, with the uplink communication, at least one of the RRC resume cause indication or the UE ID may include multiplexing, with the RRC message, only one RRC resume cause indication and the UE ID. In some aspects, the UE 502 may multiplex only the UE ID with the uplink communication.

As shown by reference number 512, the network node 504 may transmit (directly or via one or more other network nodes), and the UE 502 may receive, a first downlink communication. In some aspects, the first downlink communication may include one or more RRC messages, one or more MAC CEs, and/or DCI, among other examples. In some aspects, the first downlink communication may include configuration information and/or an activation communication. Configuration information may include an indication of one or more configuration parameters (e.g., already known to the UE 502 and/or previously indicated by the network node 504 or other network device) for selection by the UE 502, and/or explicit configuration information for the UE 502 to use to configure the UE 502, among other examples.

In some aspects, the network node 504 may transmit, and the UE 502 may receive, the first downlink communication based on the UE 502 transmitting at least one of the HARQ feedback information in response to a contention resolution message of a CBRA procedure using the common PUCCH resource set configured by system information, the RRC resume request, a BSR, or UAI. In some aspects, the network node 504 may transmit, and the UE 502 may receive, after the UE 502 transmits the at least one of the RRC resume request or the UE ID.

In some aspects, the downlink communication may indicate a dedicated PUCCH resource set. In some aspects, the downlink communication may include a configuration communication that configures the dedicated PUCCH resource set. In some other aspects, the first downlink communication may include an activation communication that activates the dedicated PUCCH resource set. In some aspects, the first downlink communication may refer to both a configuration communication and an activation communication. The dedicated PUCCH resource set may be a PUCCH resource set configured for the UE 502 to support an SDT operation.

In some aspects, the first downlink communication may indicate an enhancement configuration. The enhancement configuration may include at least one of a coverage enhancement configuration or a reliability enhancement configuration associated with the dedicated PUCCH resource set. The enhancement configuration may include one or more uplink control channel repetition configurations, one or more frequency hopping configurations, one or more demodulation reference signal bundling configurations, one or more waveform switching configurations, and/or one or more uplink control channel format switching configurations, among other examples.

In some aspects, the first downlink communication may indicate at least one of a configuration of a CG associated with an SDT operation or an activation of the CG, and the UE 502 may transmit, based on the UE 502 being configured with valid CG PUSCH occasions with associated DMRS resources and a valid TA, and further based on at least one of a priority associated with the SDT operation, a size associated with the valid CG PUSCH occasions, a volume of uplink data available at one or multiple radio bearers of the UE, a reference signal received power measurement associated with the UE, a mobility status of the UE, a power saving configuration associated with the UE, or a power saving configuration associated with the network node, an RRC resume request associated with an SDT operation that includes at least one of the MT-SDT communication, or an MO-SDT communication.

In some aspects, the UE 502 may transmit the RRC resume request on a valid CG PUSCH occasion with an associated DMRS by multiplexing, with an uplink communication, at least one of an RRC resume cause indication or a UE ID associated with the UE 502. The uplink communication may include an RRC message or a MAC CE. In some aspects, the UE 502 may multiplex, with the RRC message or the MAC CE, the at least one of the RRC resume cause indication or the UE ID by multiplexing, with the RRC message, only one RRC resume cause indication and the UE ID.

In some aspects, the first downlink communication may be received while the UE is in an RRC connected state with the network node 504 and may include configuration information for a CG-SDT operation. In some aspects, the UE 502 may receive the first downlink communication based on transmitting the RRC resume request in response to receiving a paging indication for the MT-SDT communication associated with an RRC inactive state.

In some aspects, the first downlink communication may indicate at least one of a configuration of a CG associated with an SDT operation or an activation of the CG. The UE 502 may transmit, based on the UE 502 being configured with valid CG PUSCH occasions with associated DMRS resources and a valid TA, and further based on at least one of a priority associated with the SDT operation, a size associated with the valid CG PUSCH occasions, a volume of uplink data available at one or multiple radio bearers of the UE, a reference signal received power measurement associated with the UE, a mobility status of the UE, a power saving configuration associated with the UE, or a power saving configuration associated with the network node, an RRC resume request associated with an SDT operation that includes at least one of the MT-SDT communication, or an MO-SDT communication.

In some aspects, the UE 502 may transmit the RRC resume request on a valid CG PUSCH occasion with an associated DMRS by multiplexing, with an uplink communication, at least one of an RRC resume cause indication or a UE ID associated with the UE 502. The uplink communication may include an RRC message or a MAC CE. In some aspects, the UE 502 may multiplex only one RRC resume cause indication and the UE ID. In some other aspects, the UE 502 may multiplex multiple RRC resume cause indications and the UE ID. In some aspects, receiving the first downlink communication may include receiving configuration information for a CG-SDT operation in an RRC release message associated with an RRC connected state. In some aspects, receiving the first downlink communication may include receiving the first downlink communication based on transmitting the RRC resume request in response to receiving a paging indication for the MT-SDT communication associated with an RRC inactive state.

As shown by reference number 514, the UE 502 may transmit, and the network node 504 may receive UCI. The UCI may be transmitted using the dedicated PUCCH resource set or a common PUCCH resource set. In some aspects, the UCI may include HARQ feedback information. In some aspects, transmitting the HARQ feedback information may include multiplexing the HARQ feedback information with at least one of a BSR, an SR, or UAI. In some aspects, transmitting the HARQ feedback information may include transmitting a UCI communication using the dedicated PUCCH resource set or the common PUCCH resource set, in response to receiving the downlink communication or an additional downlink communication associated with the MT-SDT operation, the MO-SDT, and non-SDT scheduled with a unique UE ID.

As shown by reference number 516, the network node 504 may transmit, and the UE 502 may receive, a second downlink communication. The second downlink communication may include an MT-SDT communication or a non-SDT communication received while the UE 502 is in an RRC inactive or idle state. In some aspects, the network node 504 may transmit, and the UE 502 may receive, the second downlink communication based on the UE 502 transmitting at least one of the HARQ feedback information using the common PUCCH resource set or the dedicated PUCCH resource set, the RRC resume request, a BSR, or UAI. As shown by reference number 518, the network node 504 may transmit, and the UE 502 may receive, based on the UE 502 transmitting the SR with a valid TA, an uplink grant for at least one of data information, control information, or a reference signal. In some aspects, the uplink grant may include a dynamic uplink resource grant for transmitting at least one of the UCI, a MAC CE, an RRC message, or data information. In some aspects, the uplink grant may be transmitted in response to an SR, transmitted by the UE 502, for an uplink grant. The UE 502 may transmit the SR using the dedicated PUCCH resource set.

As shown by reference number 520, the UE 502 may transmit, and the network node 504 may receive, an uplink communication. For example, the UE 502 may transmit the uplink communication based on the uplink grant.

As indicated above, FIG. 5 is provided as an example. Other examples may differ from what is described with respect to FIG. 5.

Figure 6:
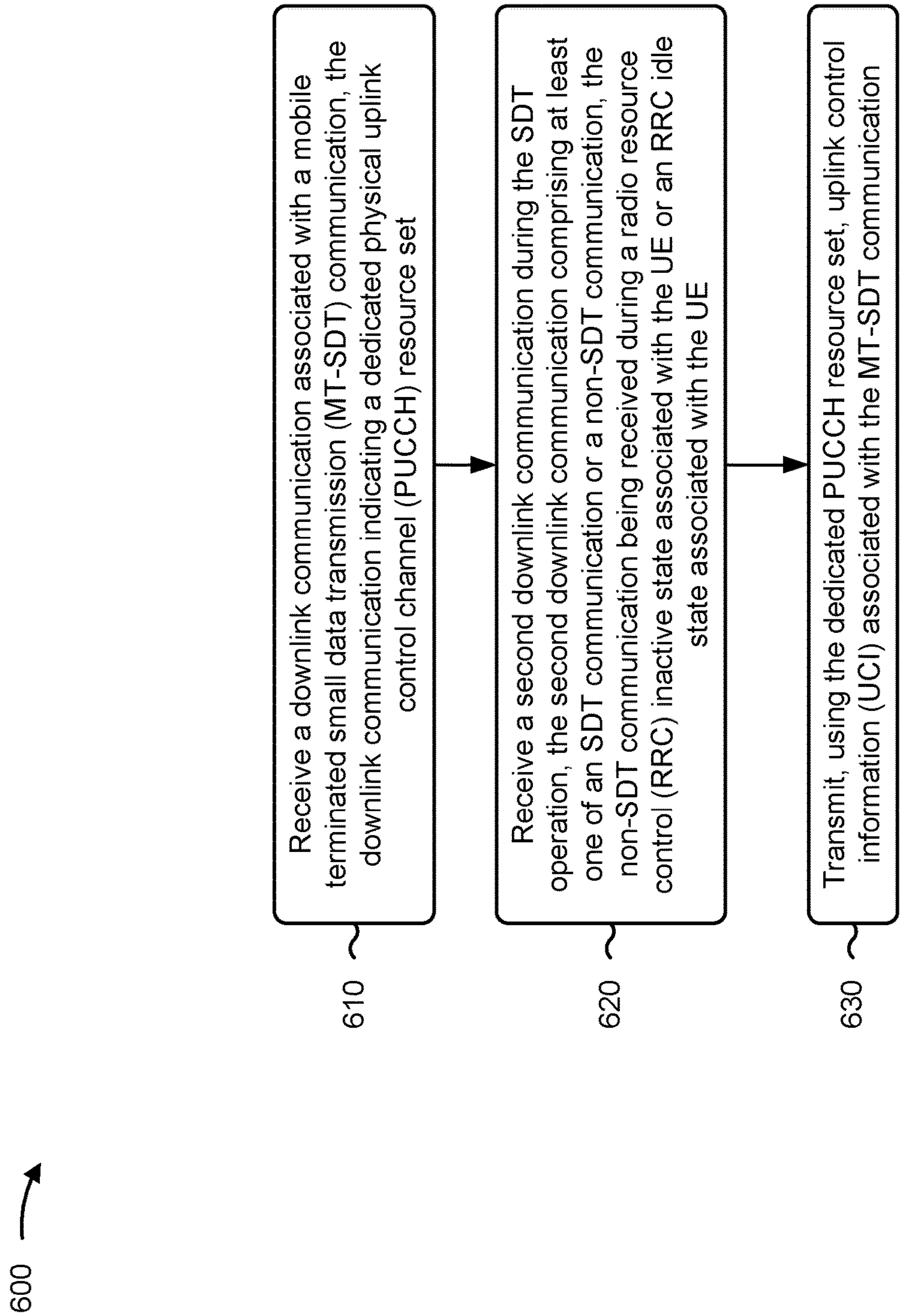
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with transmitting UCI associated with an SDT operation.

As shown in FIG. 6, in some aspects, process 600 may include receiving a first downlink communication associated with an SDT operation, the first downlink communication indicating a dedicated PUCCH resource set (block 610). For example, the UE (e.g., using reception component 802 and/or communication manager 806, depicted in FIG. 8) may receive a first downlink communication associated with an SDT communication, the first downlink communication indicating a dedicated PUCCH resource set, as described above.

As further shown in FIG. 6, in some aspects, process 600 may include receiving a second downlink communication during the SDT operation, the second downlink communication comprising at least one of an SDT communication or a non-SDT communication, the non-SDT communication being received during an RRC inactive state associated with the UE or an RRC idle state associated with the UE (block 620). For example, the UE (e.g., using reception component 802 and/or communication manager 806, depicted in FIG. 8) may receive a second downlink communication during the SDT operation, the second downlink communication comprising at least one of an SDT communication or a non-SDT communication, the non-SDT communication being received during a radio resource control (RRC) inactive state associated with the UE or an RRC idle state associated with the UE, as described above.

As further shown in FIG. 6, in some aspects, process 600 may include transmitting, using the dedicated PUCCH resource set, UCI associated with the second downlink communication (block 630). For example, the UE (e.g., using transmission component 804 and/or communication manager 806, depicted in FIG. 8) may transmit, using the dedicated PUCCH resource set, UCI associated with the second downlink communication, as described above.

Process 600 may include additional aspects, such as any single aspect or any combination of aspects described below and/or in connection with one or more other processes described elsewhere herein.

In a first aspect, receiving the first downlink communication comprises receiving at least one of a configuration information or an activation communication that activates the dedicated PUCCH resource set.

In a second aspect, alone or in combination with the first aspect, the UCI comprises a scheduling request for requesting a set of uplink resources to be used for transmitting at least one of an uplink communication, HARQ feedback information, channel state information, link recovery request information, or early termination information associated with the SDT operation.

In a third aspect, alone or in combination with one or more of the first and second aspects, the uplink communication comprises at least one of a MAC CE, an RRC message, an MO-SDT, a non-SDT uplink message, or a reference signal.

In a fourth aspect, alone or in combination with one or more of the first through third aspects, the MAC CE comprises at least one of a buffer status report, a power headroom report, a timing advance report, a request for activation of measurement gaps, a request for deactivation of measurement gaps, a request for network assistance information, a request for downlink reference signals, or an aperiodic channel state information report.

In a fifth aspect, alone or in combination with one or more of the first through fourth aspects, the non-SDT uplink message comprises UE assistance information.

In a sixth aspect, alone or in combination with one or more of the first through fifth aspects, the reference signal comprises at least one of a sounding reference signal, a physical random access channel communication, a sensing and ranging signal, or a phase tracking reference signal.

In a seventh aspect, alone or in combination with one or more of the first through sixth aspects, the HARQ feedback information is associated with at least one of the MT-SDT communication or a non-SDT downlink communication.

In an eighth aspect, alone or in combination with one or more of the first through seventh aspects, the non-SDT downlink communication comprises at least one of a downlink data communication or DCI.

In a ninth aspect, alone or in combination with one or more of the first through eighth aspects, the non-SDT downlink communication comprises at least one of a TA command MAC CE, power control information, multicast-broadcast service data, positioning information, a measurement gap activation indication, a measurement gap deactivation indication, a pre-configured communication resource activation indication, a pre-configured communication resource deactivation indication, a pre-configured measurement resource activation indication, a pre-configured measurement resource deactivation indication, or upper layer control signaling information.

In a tenth aspect, alone or in combination with one or more of the first through ninth aspects, the first downlink communication indicates an enhancement configuration associated with the dedicated PUCCH resource set.

In an eleventh aspect, alone or in combination with one or more of the first through tenth aspects, the enhancement configuration comprises at least one of an uplink control channel repetition configuration, a frequency hopping configuration, a demodulation reference signal bundling configuration, a waveform switching configuration, or an uplink control channel format switching configuration.

In a twelfth aspect, alone or in combination with one or more of the first through eleventh aspects, transmitting the UCI comprises multiplexing the UCI with a PUSCH communication, based at least on a UE capability, a timeline difference between the UCI and the PUSCH communication, or a priority of the UCI.

In a thirteenth aspect, alone or in combination with one or more of the first through twelfth aspects, the PUSCH communication comprises at least one of control information or data.

In a fourteenth aspect, alone or in combination with one or more of the first through thirteenth aspects, the PUSCH communication is associated with at least one of an MT-SDT communication, a mobile originated SDT communication, or a non-SDT communication.

In a fifteenth aspect, alone or in combination with one or more of the first through fourteenth aspects, transmitting the UCI comprises multiplexing the UCI with the PUSCH communication based on a priority associated with the UCI and a priority associated with the PUSCH being equal.

In a sixteenth aspect, alone or in combination with one or more of the first through fifteenth aspects, transmitting the UCI comprises multiplexing the UCI with the PUSCH communication based on a starting symbol associated with the dedicated uplink control channel resource set being aligned with a starting symbol associated with the PUSCH.

In a seventeenth aspect, alone or in combination with one or more of the first through sixteenth aspects, process 600 includes receiving, from a network node associated with a cell, a paging indication associated with an MT-SDT operation, and performing, based on receiving the paging indication, a CBRA procedure associated with the cell based on the UE lacking at least one of a physical uplink shared channel configuration or a valid timing advance for uplink synchronization.

In an eighteenth aspect, alone or in combination with one or more of the first through seventeenth aspects, process 600 includes receiving system information indicating a common PUCCH resource set associated with the CBRA procedure.

In a nineteenth aspect, alone or in combination with one or more of the first through eighteenth aspects, the common PUCCH resource set comprises at least one of a RedCap resource set or a non-RedCap resource set, based on a first initial uplink BWP and a second initial BWP being separately configured, wherein the first initial BWP corresponds to a RedCap UE type and the second initial uplink BWP corresponds to a non-RedCap UE type.

In a twentieth aspect, alone or in combination with one or more of the first through nineteenth aspects, the common PUCCH resource set comprises the RedCap resource set, the UE comprises a RedCap UE being separately configured with an initial uplink RedCap bandwidth part, and the system information further indicates at least one of an intra-slot frequency hopping configuration or a RedCap-specific physical resource block offset.

In a twenty-first aspect, alone or in combination with one or more of the first through twentieth aspects, process 600 includes transmitting an RRC resume request on a PUSCH channel associated with the CBRA procedure, receiving an additional downlink communication including at least a contention resolution message associated with the CBRA procedure, and transmitting, using the PUCCH resource set, HARQ feedback information in response to receiving the contention resolution message.

In a twenty-second aspect, alone or in combination with one or more of the first through twenty-first aspects, the CBRA procedure comprises a two-step RACH procedure, the HARQ feedback information is associated with the contention resolution message, the additional downlink communication comprises a random access response addressed to a msgB-radio network temporary identifier or a UE identifier, and transmitting the RRC resume request comprises transmitting a msgA of the two-step RACH procedure comprising the RRC resume request.

In a twenty-third aspect, alone or in combination with one or more of the first through twenty-second aspects, the CBRA procedure comprises a four-step RACH procedure, the HARQ feedback information is associated with the contention resolution message, the additional downlink communication comprises a random access response addressed to a radio access radio network temporary identifier or a UE identifier, and transmitting the RRC resume request comprises transmitting a msg3 of the four-step RACH procedure comprising the RRC resume request.

In a twenty-fourth aspect, alone or in combination with one or more of the first through twenty-third aspects, transmitting the HARQ feedback information comprises transmitting HARQ ACK information, and receiving the downlink communication comprises receiving the downlink communication based on transmitting the RRC resume request and the HARQ ACK information in response to the contention resolution message of the CBRA procedure.

In a twenty-fifth aspect, alone or in combination with one or more of the first through twenty-fourth aspects, process 600 includes receiving, from a network node associated with a cell, a paging indication associated with an MT-SDT operation, and transmitting, based on receiving the paging indication and further based on the UE being configured with a set of valid PUSCH resources and a valid timing advance, an RRC resume request associated with an SDT operation comprising at least one of the MT-SDT operation or an MO-SDT operation.

In a twenty-sixth aspect, alone or in combination with one or more of the first through twenty-fifth aspects, transmitting the RRC resume request comprises multiplexing, with an uplink communication, at least one of an RRC resume cause indication or a UE ID associated with the MT-SDT operation or the MO-SDT operation, and the uplink communication comprises an RRC message or a MAC CE carrying additional data and control information.

In a twenty-seventh aspect, alone or in combination with one or more of the first through twenty-sixth aspects, multiplexing, with the uplink communication, the at least one of the RRC resume cause indication or the UE ID comprises multiplexing, with the RRC message, only one RRC resume cause indication and the UE ID.

In a twenty-eighth aspect, alone or in combination with one or more of the first through twenty-seventh aspects, multiplexing, with the uplink communication, the at least one of the RRC resume cause indication or the UE ID comprises multiplexing, with the RRC message, only the UE ID.

In a twenty-ninth aspect, alone or in combination with one or more of the first through twenty-eighth aspects, receiving the first downlink communication comprises receiving the first downlink communication after transmitting the at least one of the RRC resume request or the UE ID, and process 600 includes transmitting HARQ feedback information using the dedicated PUCCH resource set or a common PUCCH resource set configured by system information.

In a thirtieth aspect, alone or in combination with one or more of the first through twenty-ninth aspects, transmitting the HARQ feedback information comprises multiplexing the HARQ feedback information with at least one of a buffer status report, a scheduling request, or UE assistance information.

In a thirty-first aspect, alone or in combination with one or more of the first through thirtieth aspects, transmitting the HARQ feedback information comprises transmitting a UCI communication using the dedicated PUCCH resource set or the common PUCCH resource set, in response to receiving the downlink communication or an additional downlink communication associated with the MT-SDT operation, the MO-SDT and non-SDT scheduled with a unique UE ID.

In a thirty-second aspect, alone or in combination with one or more of the first through thirty-first aspects, receiving the first downlink communication comprises receiving the first downlink communication based on transmitting at least one of the HARQ feedback information in response to a contention resolution message of a CBRA procedure using the common PUCCH resource set configured by system information, the RRC resume request, a buffer status report, or UE assistance information.

In a thirty-third aspect, alone or in combination with one or more of the first through thirty-second aspects, process 600 includes receiving the second downlink communication based on transmitting at least one of the HARQ feedback information using the common PUCCH resource set or the dedicated PUCCH resource set, the RRC resume request, a buffer status report, or UE assistance information.

In a thirty-fourth aspect, alone or in combination with one or more of the first through thirty-third aspects, receiving the first downlink communication comprises receiving, from a network node associated with a cell, the first downlink communication, wherein the first downlink communication indicates at least one of a configuration of a CG associated with an SDT operation or an activation of the CG, and process 600 includes transmitting, based on the UE being configured with valid CG PUSCH occasions with associated DMRS resources and a valid timing advance, and further based on at least one of a priority associated with the SDT operation, a size associated with the valid CG PUSCH occasions, a volume of uplink data available at one or multiple radio bearers of the UE, a reference signal received power measurement associated with the UE, a mobility status of the UE, a power saving configuration associated with the UE, or a power saving configuration associated with the network node, an RRC resume request associated with an SDT operation comprising at least one of an MT-SDT communication, or an MO-SDT communication.

In a thirty-fifth aspect, alone or in combination with one or more of the first through thirty-fourth aspects, transmitting the RRC resume request on a valid CG PUSCH occasion with an associated DMRS comprises multiplexing, with an uplink communication, at least one of an RRC resume cause indication or a UE ID associated with the UE, and the uplink communication comprises an RRC message or a MAC CE.

In a thirty-sixth aspect, alone or in combination with one or more of the first through thirty-fifth aspects, multiplexing, with the RRC message or the MAC CE, the at least one of the RRC resume cause indication or the UE ID comprises multiplexing, with the RRC message, only one RRC resume cause indication and the UE ID.

In a thirty-seventh aspect, alone or in combination with one or more of the first through thirty-sixth aspects, receiving the first downlink communication comprises receiving configuration information for a CG-SDT operation in an RRC release message associated with an RRC connected state.

In a thirty-eighth aspect, alone or in combination with one or more of the first through thirty-seventh aspects, receiving the first downlink communication comprises receiving the first downlink communication based on transmitting the RRC resume request in response to receiving a paging indication for the MT-SDT communication associated with an RRC inactive state.

In a thirty-ninth aspect, alone or in combination with one or more of the first through thirty-eighth aspects, process 600 includes receiving the MT-SDT communication based on transmitting the RRC resume request.

In a fortieth aspect, alone or in combination with one or more of the first through thirty-ninth aspects, transmitting the RRC resume request comprises multiplexing the RRC resume request with at least one of a buffer status report or UE assistance information.

In a forty-first aspect, alone or in combination with one or more of the first through fortieth aspects, transmitting the RRC resume request comprises transmitting a dedicated RRC resume request message.

In a forty-second aspect, alone or in combination with one or more of the first through forty-first aspects, process 600 includes receiving, based on transmitting the RRC resume request, a dynamic uplink resource grant for transmitting at least one of the UCI, a MAC CE, an RRC message, or data information.

In a forty-third aspect, alone or in combination with one or more of the first through forty-second aspects, process 600 includes transmitting a scheduling request for an uplink grant using the dedicated PUCCH resource set, and receiving, based on transmitting the scheduling request with a valid TA, an uplink grant for at least one of data information, control information, or a reference signal.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
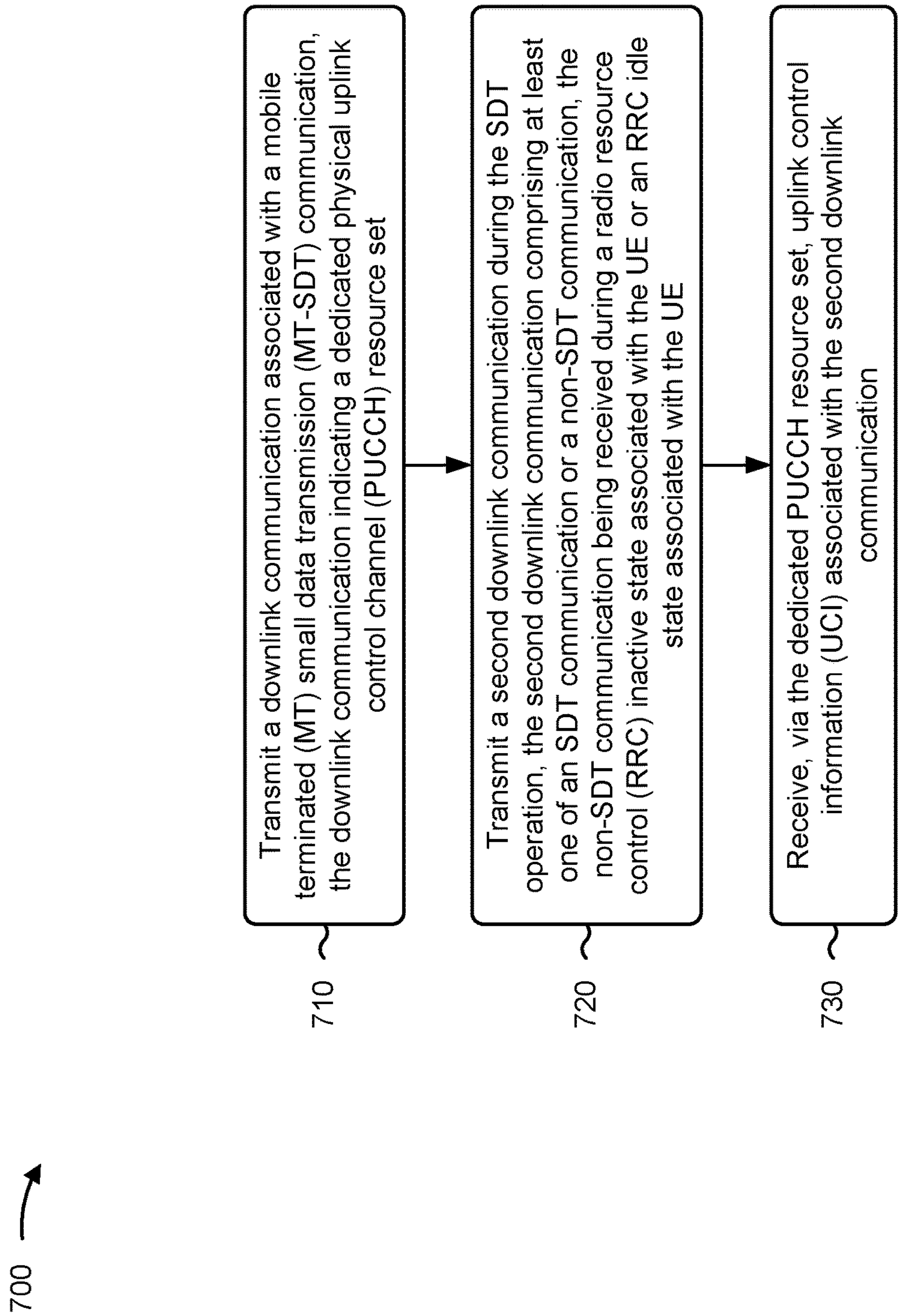
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 110) performs operations associated with transmitting UCI associated with an SDT operation.

As shown in FIG. 7, in some aspects, process 700 may include transmitting a first downlink communication associated with an SDT operation, the first downlink communication indicating a dedicated PUCCH resource set (block 710). For example, the network node (e.g., using transmission component 904 and/or communication manager 906, depicted in FIG. 9) may transmit a first downlink communication associated with an SDT operation, the first downlink communication indicating a dedicated PUCCH resource set, as described above.

As further shown in FIG. 7, in some aspects, process 700 may include transmitting a second downlink communication during the SDT operation, the second downlink communication comprising at least one of an SDT communication or a non-SDT communication, the non-SDT communication being received during an RRC inactive state associated with the UE or an RRC idle state associated with the UE (block 720). For example, the network node (e.g., using transmission component 904 and/or communication manager 906, depicted in FIG. 9) may transmit a second downlink communication during the SDT operation, the second downlink communication comprising at least one of an SDT communication or a non-SDT communication, the non-SDT communication being received during an RRC inactive state associated with the UE or an RRC idle state associated with the UE, as described above.

As further shown in FIG. 7, in some aspects, process 700 may include receiving, via the dedicated PUCCH resource set, UCI associated with the second downlink communication (block 730). For example, the network node (e.g., using reception component 902 and/or communication manager 906, depicted in FIG. 9) may receive, via the dedicated PUCCH resource set, UCI associated with the second downlink communication, as described above.

Process 700 may include additional aspects, such as any single aspect or any combination of aspects described below and/or in connection with one or more other processes described elsewhere herein.

In a first aspect, transmitting the first downlink communication comprises transmitting at least one of a configuration information or an activation communication that activates the dedicated PUCCH resource set.

In a second aspect, alone or in combination with the first aspect, the UCI comprises a scheduling request for requesting a set of uplink resources to be used for transmitting at least one of an uplink communication, HARQ feedback information, channel state information, link recovery request information, or early termination information associated with the SDT operation.

In a third aspect, alone or in combination with one or more of the first and second aspects, the uplink communication comprises at least one of a MAC CE, an RRC message, an MO-SDT, a non-SDT uplink message, or a reference signal.

In a fourth aspect, alone or in combination with one or more of the first through third aspects, the MAC CE comprises at least one of a buffer status report, a power headroom report, a timing advance report, a request for activation of measurement gaps, a request for deactivation of measurement gaps, a request for network assistance information, a request for downlink reference signals, or an aperiodic channel state information report.

In a fifth aspect, alone or in combination with one or more of the first through fourth aspects, the non-SDT uplink message comprises UE assistance information.

In a sixth aspect, alone or in combination with one or more of the first through fifth aspects, the reference signal comprises at least one of a sounding reference signal, a physical random access channel communication, a sensing and ranging signal, or a phase tracking reference signal.

In a seventh aspect, alone or in combination with one or more of the first through sixth aspects, the HARQ feedback information is associated with at least one of the MT-SDT communication or a non-SDT downlink communication.

In an eighth aspect, alone or in combination with one or more of the first through seventh aspects, the non-SDT downlink communication comprises at least one of a downlink data communication or DCI.

In a ninth aspect, alone or in combination with one or more of the first through eighth aspects, the non-SDT downlink communication comprises at least one of a timing advance command medium access control control element, power control information, multicast-broadcast service data, positioning information, a measurement gap activation indication, a measurement gap deactivation indication, a pre-configured communication resource activation indication, a pre-configured communication resource deactivation indication, a pre-configured measurement resource activation indication, a pre-configured measurement resource deactivation indication, or upper layer control signaling information.

In a tenth aspect, alone or in combination with one or more of the first through ninth aspects, the first downlink communication indicates an enhancement configuration associated with the dedicated PUCCH resource set.

In an eleventh aspect, alone or in combination with one or more of the first through tenth aspects, the enhancement configuration comprises at least one of an uplink control channel repetition configuration, a frequency hopping configuration, a demodulation reference signal bundling configuration, a waveform switching configuration, or an uplink control channel format switching configuration.

In a twelfth aspect, alone or in combination with one or more of the first through eleventh aspects, receiving the UCI comprises multiplexing the UCI with a PUSCH communication, based at least on a UE capability, a timeline difference between the UCI and the PUSCH communication, or a priority of the UCI.

In a thirteenth aspect, alone or in combination with one or more of the first through twelfth aspects, the PUSCH communication comprises at least one of control information or data.

In a fourteenth aspect, alone or in combination with one or more of the first through thirteenth aspects, the PUSCH communication is associated with at least one of an MT-SDT communication, a mobile originated SDT communication, or a non-SDT communication.

In a fifteenth aspect, alone or in combination with one or more of the first through fourteenth aspects, receiving the UCI comprises multiplexing the UCI with the PUSCH communication based on a priority associated with the UCI and a priority associated with the PUSCH being equal.

In a sixteenth aspect, alone or in combination with one or more of the first through fifteenth aspects, receiving the UCI comprises multiplexing the UCI with the PUSCH communication based on a starting symbol associated with the dedicated uplink control channel resource set being aligned with a starting symbol associated with the PUSCH.

In a seventeenth aspect, alone or in combination with one or more of the first through sixteenth aspects, process 700 includes transmitting, to a UE, a paging indication associated with an MT-SDT operation corresponding to a cell, and performing, based on receiving the paging indication, a CBRA procedure associated with the cell based on the UE lacking at least one of a physical uplink shared channel configuration or a valid timing advance for uplink synchronization.

In an eighteenth aspect, alone or in combination with one or more of the first through seventeenth aspects, process 700 includes transmitting system information indicating a common PUCCH resource set associated with the CBRA procedure.

In a nineteenth aspect, alone or in combination with one or more of the first through eighteenth aspects, the common PUCCH resource set comprises at least one of a RedCap resource set or a non-RedCap resource set, based on a first initial uplink BWP and a second initial BWP being separately configured, wherein the first initial BWP corresponds to a RedCap UE type and the second initial uplink BWP corresponds to a non-RedCap UE type.

In a twentieth aspect, alone or in combination with one or more of the first through nineteenth aspects, the common PUCCH resource set comprises the RedCap resource set, the UE comprises a RedCap UE being separately configured with an initial uplink RedCap bandwidth part, and the system information further indicates at least one of an intra-slot frequency hopping configuration or a RedCap-specific physical resource block offset.

In a twenty-first aspect, alone or in combination with one or more of the first through twentieth aspects, process 700 includes receiving an RRC resume request on a PUSCH channel associated with the CBRA procedure, transmitting an additional downlink communication including at least a contention resolution message associated with the CBRA procedure, and receiving, using the PUCCH resource set, HARQ feedback information in response to receiving the contention resolution message.

In a twenty-second aspect, alone or in combination with one or more of the first through twenty-first aspects, the CBRA procedure comprises a two-step RACH procedure, the HARQ feedback information is associated with the contention resolution message, the additional downlink communication comprises a random access response addressed to a msgB-radio network temporary identifier or a UE identifier, and receiving the RRC resume request comprises receiving a msgA of the two-step RACH procedure comprising the RRC resume request.

In a twenty-third aspect, alone or in combination with one or more of the first through twenty-second aspects, the CBRA procedure comprises a four-step RACH procedure, the HARQ feedback information is associated with the contention resolution message, the additional downlink communication comprises a random access response addressed to a radio access radio network temporary identifier or a UE identifier, and receiving the RRC resume request comprises receiving a msg3 of the four-step RACH procedure comprising the RRC resume request.

In a twenty-fourth aspect, alone or in combination with one or more of the first through twenty-third aspects, receiving the HARQ feedback information comprises receiving HARQ ACK information, and transmitting the downlink communication comprises transmitting the downlink communication based on receiving the RRC resume request and the HARQ ACK information in response to the contention resolution message of the CBRA procedure.

In a twenty-fifth aspect, alone or in combination with one or more of the first through twenty-fourth aspects, process 700 includes transmitting, to a UE, a paging indication associated with an MT-SDT operation corresponding to a cell, and receiving, based on transmitting the paging indication and further based on the UE being configured with a set of valid PUSCH resources and a valid timing advance, an RRC resume request associated with an SDT operation comprising at least one of the MT-SDT operation or an MO-SDT operation.

In a twenty-sixth aspect, alone or in combination with one or more of the first through twenty-fifth aspects, receiving the RRC resume request comprises multiplexing, with an uplink communication, at least one of an RRC resume cause indication or a UE ID associated with the MT-SDT operation or the MO-SDT operation, and the uplink communication comprises an RRC message or a MAC CE carrying additional data and control information.

In a twenty-seventh aspect, alone or in combination with one or more of the first through twenty-sixth aspects, multiplexing, with the uplink communication, the at least one of the RRC resume cause indication or the UE ID comprises multiplexing, with the RRC message, only one RRC resume cause indication and the UE ID.

In a twenty-eighth aspect, alone or in combination with one or more of the first through twenty-seventh aspects, multiplexing, with the uplink communication, the at least one of the RRC resume cause indication or the UE ID comprises multiplexing, with the RRC message, only the UE ID.

In a twenty-ninth aspect, alone or in combination with one or more of the first through twenty-eighth aspects, transmitting the first downlink communication comprises transmitting the first downlink communication after receiving the at least one of the RRC resume request or the UE ID, and process 700 includes receiving HARQ feedback information using the dedicated PUCCH resource set or a common PUCCH resource set configured by system information.

In a thirtieth aspect, alone or in combination with one or more of the first through twenty-ninth aspects, receiving the HARQ feedback information comprises multiplexing the HARQ feedback information with at least one of a buffer status report, a scheduling request, or UE assistance information.

In a thirty-first aspect, alone or in combination with one or more of the first through thirtieth aspects, receiving the HARQ feedback information comprises receiving a UCI communication using the dedicated PUCCH resource set or the common PUCCH resource set, in response to transmitting the downlink communication or an additional downlink communication associated with the MT-SDT operation, the MO-SDT and non-SDT scheduled with a unique UE ID.

In a thirty-second aspect, alone or in combination with one or more of the first through thirty-first aspects, transmitting the first downlink communication comprises transmitting the first downlink communication based on receiving at least one of the HARQ feedback information in response to a contention resolution message of a CBRA procedure using the common PUCCH resource set configured by system information, the RRC resume request, a buffer status report, or UE assistance information.

In a thirty-third aspect, alone or in combination with one or more of the first through thirty-second aspects, process 700 includes transmitting the second downlink communication based on receiving at least one of the HARQ feedback information using the common PUCCH resource set or the dedicated PUCCH resource set, the RRC resume request, a buffer status report, or UE assistance information.

In a thirty-fourth aspect, alone or in combination with one or more of the first through thirty-third aspects, transmitting the first downlink communication comprises transmitting, from a network node associated with a cell, the first downlink communication, wherein the first downlink communication indicates at least one of a configuration of a CG associated with an SDT operation or an activation of the CG, and process 700 includes receiving, based on the UE being configured with valid CG PUSCH occasions with associated DMRS resources and a valid timing advance, and further based on at least one of a priority associated with the SDT operation, a size associated with the valid CG PUSCH occasions, a volume of uplink data available at one or multiple radio bearers of the UE, a reference signal received power measurement associated with the UE, a mobility status of the UE, a power saving configuration associated with the UE, or a power saving configuration associated with the network node, an RRC resume request associated with an SDT operation comprising at least one of an MT-SDT communication, or an MO-SDT communication.

In a thirty-fifth aspect, alone or in combination with one or more of the first through thirty-fourth aspects, receiving the RRC resume request on a valid CG PUSCH occasion with an associated DMRS comprises multiplexing, with an uplink communication, at least one of an RRC resume cause indication or a UE ID associated with the UE, and the uplink communication comprises an RRC message or a MAC CE.

In a thirty-sixth aspect, alone or in combination with one or more of the first through thirty-fifth aspects, multiplexing, with the RRC message or the MAC CE, the at least one of the RRC resume cause indication or the UE ID comprises multiplexing, with the RRC message, only one RRC resume cause indication and the UE ID.

In a thirty-seventh aspect, alone or in combination with one or more of the first through thirty-sixth aspects, transmitting the first downlink communication comprises transmitting configuration information for a CG-SDT operation in an RRC release message associated with an RRC connected state.

In a thirty-eighth aspect, alone or in combination with one or more of the first through thirty-seventh aspects, transmitting the first downlink communication comprises transmitting configuration information based on receiving the RRC resume request in response to transmitting a paging indication for the MT-SDT communication associated with an RRC inactive state.

In a thirty-ninth aspect, alone or in combination with one or more of the first through thirty-eighth aspects, process 700 includes transmitting the MT-SDT communication based on receiving the RRC resume request.

In a fortieth aspect, alone or in combination with one or more of the first through thirty-ninth aspects, receiving the RRC resume request comprises multiplexing the RRC resume request with at least one of a buffer status report or UE assistance information.

In a forty-first aspect, alone or in combination with one or more of the first through fortieth aspects, receiving the RRC resume request comprises receiving a dedicated RRC resume request message.

In a forty-second aspect, alone or in combination with one or more of the first through forty-first aspects, process 700 includes transmitting, based on receiving the RRC resume request, a dynamic uplink resource grant for transmitting at least one of the UCI, a MAC CE, a radio resource control message, or data information.

In a forty-third aspect, alone or in combination with one or more of the first through forty-second aspects, process 700 includes receiving a scheduling request for an uplink grant using the dedicated PUCCH resource set, and transmitting, based on receiving the scheduling request with at least one of a valid TA, an uplink grant for at least one of data information, control information, or a reference signal.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
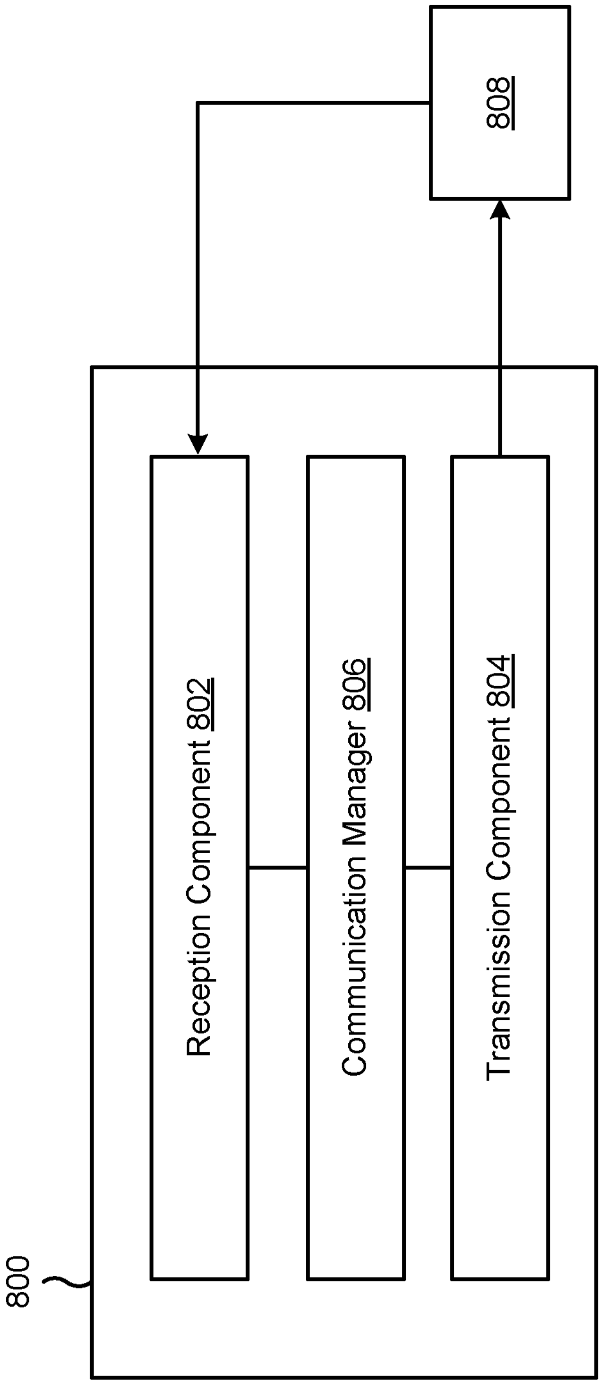
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory.

For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The reception component 802 may receive a downlink communication associated with an MT-SDT communication, the downlink communication indicating a dedicated PUCCH resource set. The transmission component 804 may transmit, using the dedicated PUCCH resource set, UCI associated with the MT-SDT communication. The reception component 802 may receive, from a network node associated with a cell, a paging indication associated with an MT-SDT operation. The communication manager 806 may perform, based on receiving the paging indication, a CBRA procedure associated with the cell based on the UE lacking at least one of a physical uplink shared channel configuration or a valid timing advance. The reception component 802 may receive system information indicating a common PUCCH resource set associated with the CBRA procedure. The transmission component 804 may transmit an RRC resume request on a PUSCH channel associated with the CBRA procedure.

The reception component 802 may receive an additional downlink communication including at least a contention resolution message associated with the CBRA procedure. The transmission component 804 may transmit, using the PUCCH resource set, HARQ feedback information in response to receiving the contention resolution message. The reception component 802 may receive, from a network node associated with a cell, a paging indication associated with an MT-SDT operation. The transmission component 804 may transmit, based on receiving the paging indication and further based on the UE being configured with a set of valid PUSCH resources and a valid timing advance, an RRC resume request associated with an SDT operation comprising at least one of the MT-SDT operation or an MO-SDT operation. The reception component 802 may receive the MT-SDT communication based on transmitting at least one of the HARQ feedback information using the common PUCCH resource set or the dedicated PUCCH resource set, the RRC resume request, a buffer status report, or UE assistance information. The reception component 802 may receive the MT-SDT communication based on transmitting the RRC resume request.

The reception component 802 may receive, based on transmitting the RRC resume request, a dynamic uplink resource grant for transmitting at least one of the UCI, a MAC CE, a radio resource control message, or data information. The transmission component 804 may transmit a scheduling request for an uplink grant using the dedicated PUCCH resource set. The reception component 802 may receive, based on transmitting the scheduling request with a valid TA, an uplink grant for at least one of data information, control information, or a reference signal.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
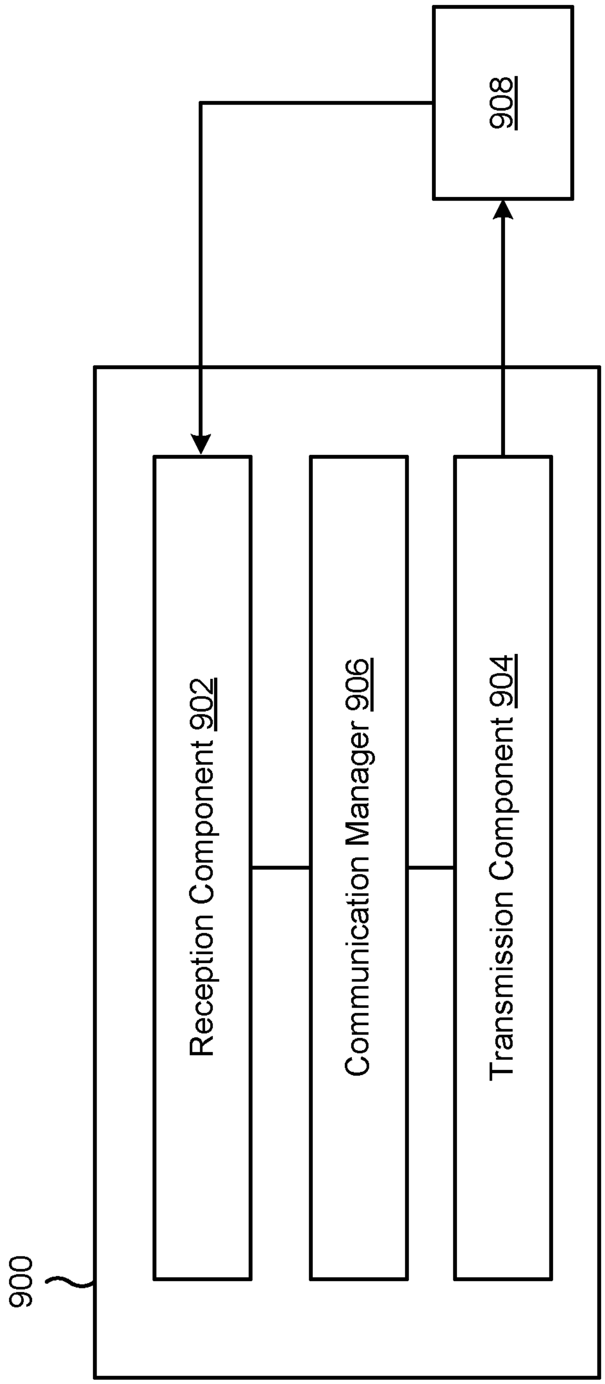
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The transmission component 904 may transmit a downlink communication associated with an MT-SDT communication, the downlink communication indicating a dedicated PUCCH resource set. The reception component 902 may receive, via the dedicated PUCCH resource set, UCI associated with the MT-SDT communication. The transmission component 904 may transmit, to a UE, a paging indication associated with an MT-SDT operation corresponding to a cell. The communication manager 906 may perform, based on receiving the paging indication, a CBRA procedure associated with the cell based on the UE lacking at least one of a physical uplink shared channel configuration or a valid timing advance.

The transmission component 904 may transmit system information indicating a common PUCCH resource set associated with the CBRA procedure. The reception component 902 may receive an RRC resume request on a PUSCH channel associated with the CBRA procedure. The transmission component 904 may transmit an additional downlink communication including at least a contention resolution message associated with the CBRA procedure. The reception component 902 may receive, using the PUCCH resource set, HARQ feedback information in response to receiving the contention resolution message.

The transmission component 904 may transmit, to a UE, a paging indication associated with an MT-SDT operation corresponding to a cell. The reception component 902 may receive, based on transmitting the paging indication and further based on the UE being configured with a set of valid PUSCH resources and a valid timing advance, an RRC resume request associated with an SDT operation comprising at least one of the MT-SDT operation or an MO-SDT operation. The transmission component 904 may transmit the MT-SDT communication based on receiving at least one of the HARQ feedback information using the common PUCCH resource set or the dedicated PUCCH resource set, the RRC resume request, a buffer status report, or UE assistance information. The transmission component 904 may transmit the MT-SDT communication based on receiving the RRC resume request. The transmission component 904 may transmit, based on receiving the RRC resume request, a dynamic uplink resource grant for transmitting at least one of the UCI, a MAC CE, a radio resource control message, or data information. The reception component 902 may receive a scheduling request for an uplink grant using the dedicated PUCCH resource set. The transmission component 904 may transmit, based on receiving the scheduling request with at least one of a valid TA, an uplink grant for at least one of data information, control information, or a reference signal.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a first downlink communication associated with a small data transmission (SDT) operation, the first downlink communication indicating a dedicated physical uplink control channel (PUCCH) resource set; receiving a second downlink communication during the SDT operation, the second downlink communication comprising at least one of an SDT communication or a non-SDT communication, the non-SDT communication being received during a radio resource control (RRC) inactive state associated with the UE or an RRC idle state associated with the UE; and transmitting, using the dedicated PUCCH resource set, uplink control information (UCI) associated with the second downlink communication.

Aspect 2: The method of Aspect 1, wherein receiving the first downlink communication comprises receiving at least one of a configuration information or an activation communication that activates the dedicated PUCCH resource set.

Aspect 3: The method of either of Aspects 1 or 2, wherein the UCI comprises a scheduling request for requesting a set of uplink resources to be used for transmitting at least one of an uplink communication, hybrid automatic repeat request (HARQ) feedback information, channel state information, link recovery request information, or early termination information associated with the SDT operation.

Aspect 4: The method of Aspect 3, wherein the uplink communication comprises at least one of a medium access control control element (MAC CE), a radio resource control (RRC) message, a mobile originated (MO) SDT (MO-SDT), a non-SDT uplink message, or a reference signal.

Aspect 5: The method of Aspect 4, wherein the MAC CE comprises at least one of a buffer status report, a power headroom report, a timing advance report, a request for activation of measurement gaps, a request for deactivation of measurement gaps, a request for network assistance information, a request for downlink reference signals, or an aperiodic channel state information report.

Aspect 6: The method of either of Aspects 4 or 5, wherein the non-SDT uplink message comprises UE assistance information.

Aspect 7: The method of any of Aspects 4-6, wherein the reference signal comprises at least one of a sounding reference signal, a physical random access channel communication, a sensing and ranging signal, or a phase tracking reference signal.

Aspect 8: The method of any of Aspects 3-7, wherein the HARQ feedback information is associated with at least one of the MT-SDT communication or a non-SDT downlink communication.

Aspect 9: The method of Aspect 8, wherein the non-SDT downlink communication comprises at least one of a downlink data communication or downlink control information (DCI).

Aspect 10: The method of Aspect 9, wherein the non-SDT downlink communication comprises at least one of a timing advance command medium access control control element, power control information, multicast-broadcast service data, positioning information, a measurement gap activation indication, a measurement gap deactivation indication, a pre-configured communication resource activation indication, a pre-configured communication resource deactivation indication, a pre-configured measurement resource activation indication, a pre-configured measurement resource deactivation indication, or upper layer control signaling information.

Aspect 11: The method of any of Aspects 1-10, wherein the first downlink communication indicates an enhancement configuration associated with the dedicated PUCCH resource set.

Aspect 12: The method of Aspect 11, wherein the enhancement configuration comprises at least one of an uplink control channel repetition configuration, a frequency hopping configuration, a demodulation reference signal bundling configuration, a waveform switching configuration, or an uplink control channel format switching configuration.

Aspect 13: The method of any of Aspects 1-12, wherein transmitting the UCI comprises multiplexing the UCI with a physical uplink shared channel (PUSCH) communication, based at least on a UE capability, a timeline difference between the UCI and the PUSCH communication, or a priority of the UCI.

Aspect 14: The method of Aspect 13, wherein the PUSCH communication comprises at least one of control information or data.

Aspect 15: The method of either of Aspects 13 or 14, wherein the PUSCH communication is associated with at least one of a mobile terminated SDT (MT-SDT) communication, a mobile originated SDT communication, or a non-SDT communication.

Aspect 16: The method of any of Aspects 13-15, wherein transmitting the UCI comprises multiplexing the UCI with the PUSCH communication based on a priority associated with the UCI and a priority associated with the PUSCH being equal.

Aspect 17: The method of any of Aspects 13-16, wherein transmitting the UCI comprises multiplexing the UCI with the PUSCH communication based on a starting symbol associated with the dedicated uplink control channel resource set being aligned with a starting symbol associated with the PUSCH.

Aspect 18: The method of any of Aspects 1-17, further comprising: receiving, from a network node associated with a cell, a paging indication associated with an MT-SDT operation; and performing, based on receiving the paging indication, a contention based random access (CBRA) procedure associated with the cell based on the UE lacking at least one of a physical uplink shared channel configuration or a valid timing advance for uplink synchronization.

Aspect 19: The method of Aspect 18, further comprising receiving system information indicating a common physical uplink control channel (PUCCH) resource set associated with the CBRA procedure.

Aspect 20: The method of Aspect 19, wherein the common PUCCH resource set comprises at least one of a reduced capability (RedCap) resource set or a non-RedCap resource set, based on a first initial uplink bandwidth part (BWP) and a second initial BWP being separately configured, wherein the first initial BWP corresponds to a RedCap UE type and the second initial uplink BWP corresponds to a non-RedCap UE type.

Aspect 21: The method of Aspect 20, wherein the common PUCCH resource set comprises the RedCap resource set, wherein the UE comprises a RedCap UE being separately configured with an initial uplink RedCap bandwidth part, and wherein the system information further indicates at least one of an intra-slot frequency hopping configuration or a RedCap-specific physical resource block offset.

Aspect 22: The method of any of Aspects 19-21, further comprising: transmitting a radio resource control (RRC) resume request on a physical uplink shared channel (PUSCH) channel associated with the CBRA procedure; receiving an additional downlink communication including at least a contention resolution message associated with the CBRA procedure; and transmitting, using the PUCCH resource set, hybrid automatic repeat request (HARQ) feedback information in response to receiving the contention resolution message.

Aspect 23: The method of Aspect 22, wherein the CBRA procedure comprises a two-step random access channel (RACH) procedure, wherein the HARQ feedback information is associated with the contention resolution message, wherein the additional downlink communication comprises a random access response addressed to a msgB-radio network temporary identifier or a UE identifier, and wherein transmitting the RRC resume request comprises transmitting a msgA of the two-step RACH procedure comprising the RRC resume request.

Aspect 24: The method of any of Aspects 22-23, wherein the CBRA procedure comprises a four-step random access channel (RACH) procedure, wherein the HARQ feedback information is associated with the contention resolution message, wherein the additional downlink communication comprises a random access response addressed to a radio access radio network temporary identifier or a UE identifier, and wherein transmitting the RRC resume request comprises transmitting a msg3 of the four-step RACH procedure comprising the RRC resume request.

Aspect 25: The method of any of Aspects 22-24, wherein transmitting the HARQ feedback information comprises transmitting HARQ acknowledgement (ACK) information, and wherein receiving the downlink communication comprises receiving the downlink communication based on transmitting the RRC resume request and the HARQ ACK information in response to the contention resolution message of the CBRA procedure.

Aspect 26: The method of any of Aspects 1-25, further comprising: receiving, from a network node associated with a cell, a paging indication associated with an MT-SDT operation; and transmitting, based on receiving the paging indication and further based on the UE being configured with a set of valid physical uplink shared channel (PUSCH) resources and a valid timing advance, a radio resource control (RRC) resume request associated with a small data transmission (SDT) operation comprising at least one of the MT-SDT operation or a mobile originated SDT (MO-SDT) operation.

Aspect 27: The method of Aspect 26, wherein transmitting the RRC resume request comprises multiplexing, with an uplink communication, at least one of an RRC resume cause indication or a UE identifier (ID) associated with the MT-SDT operation or the MO-SDT operation, and wherein the uplink communication comprises an RRC message or a medium access control control element (MAC CE) carrying additional data and control information.

Aspect 28: The method of Aspect 27, wherein multiplexing, with the uplink communication, the at least one of the RRC resume cause indication or the UE ID comprises multiplexing, with the RRC message, only one RRC resume cause indication and the UE ID.

Aspect 29: The method of Aspect 27, wherein multiplexing, with the uplink communication, the at least one of the RRC resume cause indication or the UE ID comprises multiplexing, with the RRC message, only the UE ID.

Aspect 30: The method of any of Aspects 27-29, wherein receiving the first downlink communication comprises receiving the first downlink communication after transmitting the at least one of the RRC resume request or the UE ID, the method further comprising transmitting hybrid automatic repeat request (HARQ) feedback information using the dedicated PUCCH resource set or a common PUCCH resource set configured by system information.

Aspect 31: The method of Aspect 30, wherein transmitting the HARQ feedback information comprises multiplexing the HARQ feedback information with at least one of a buffer status report, a scheduling request, or UE assistance information.

Aspect 32: The method of either of Aspects 30 or 31, wherein transmitting the HARQ feedback information comprises transmitting a UCI communication using the dedicated PUCCH resource set or the common PUCCH resource set, in response to receiving the downlink communication or an additional downlink communication associated with the MT-SDT operation, the MO-SDT and non-SDT scheduled with a unique UE ID.

Aspect 33: The method of any of Aspects 30-32, wherein receiving the first downlink communication comprises receiving the first downlink communication based on transmitting at least one of the HARQ feedback information in response to a contention resolution message of a contention based random access (CBRA) procedure using the common PUCCH resource set configured by system information, the RRC resume request, a buffer status report, or UE assistance information.

Aspect 34: The method of any of Aspects 30-33, further comprising receiving the second downlink communication based on transmitting at least one of the HARQ feedback information using the common PUCCH resource set or the dedicated PUCCH resource set, the RRC resume request, a buffer status report, or UE assistance information.

Aspect 35: The method of any of Aspects 1-34, wherein receiving the first downlink communication comprises receiving, from a network node associated with a cell, the first downlink communication, wherein the first downlink communication indicates at least one of a configuration of a configured grant (CG) associated with an SDT operation or an activation of the CG, the method further comprising transmitting, based on the UE being configured with valid CG physical uplink shared channel (PUSCH) occasions with associated demodulation reference signal (DMRS) resources and a valid timing advance, and further based on at least one of a priority associated with the SDT operation, a size associated with the valid CG PUSCH occasions, a volume of uplink data available at one or multiple radio bearers of the UE, a reference signal received power measurement associated with the UE, a mobility status of the UE, a power saving configuration associated with the UE, or a power saving configuration associated with the network node, a radio resource control (RRC) resume request associated with a small data transmission (SDT) operation comprising at least one of a mobile terminated SDT (MT-SDT) communication, or a mobile originated SDT (MO-SDT) communication.

Aspect 36: The method of Aspect 35, wherein transmitting the RRC resume request on a valid CG PUSCH occasion with an associated DMRS comprises multiplexing, with an uplink communication, at least one of an RRC resume cause indication or a UE identifier (ID) associated with the UE, and wherein the uplink communication comprises a radio resource control (RRC) message or a medium access control control element (MAC CE).

Aspect 37: The method of Aspect 36, wherein multiplexing, with the RRC message or the MAC CE, the at least one of the RRC resume cause indication or the UE ID comprises multiplexing, with the RRC message, only one RRC resume cause indication and the UE ID.

Aspect 38: The method of any of Aspects 35-37, wherein receiving the first downlink communication comprises receiving configuration information for a CG-SDT operation in a radio resource control (RRC) release message associated with an RRC connected state.

Aspect 39: The method of any of Aspects 35-38, wherein receiving the first downlink communication comprises receiving the first downlink communication based on transmitting the RRC resume request in response to receiving a paging indication for the MT-SDT communication associated with an RRC inactive state.

Aspect 40: The method of any of Aspects 35-39, further comprising receiving the MT-SDT communication based on transmitting the RRC resume request.

Aspect 41: The method of any of Aspects 35-39, wherein transmitting the RRC resume request comprises multiplexing the RRC resume request with at least one of a buffer status report or UE assistance information.

Aspect 42: The method of any of Aspects 35-41, wherein transmitting the RRC resume request comprises transmitting a dedicated RRC resume request message.

Aspect 43: The method of any of Aspects 35-42, further comprising receiving, based on transmitting the RRC resume request, a dynamic uplink resource grant for transmitting at least one of the UCI, a medium access control control element (MAC CE), a radio resource control message, or data information.

Aspect 44: The method of any of Aspects 35-44, further comprising: transmitting a scheduling request for an uplink grant using the dedicated PUCCH resource set; and receiving, based on transmitting the scheduling request with a valid TA, an uplink grant for at least one of data information, control information, or a reference signal.

Aspect 45: A method of wireless communication performed by a network node, comprising: transmitting a first downlink communication associated with a small data transmission (SDT) operation, the first downlink communication indicating a dedicated physical uplink control channel (PUCCH) resource set; transmitting a second downlink communication during the SDT operation, the second downlink communication comprising at least one of an SDT communication or a non-SDT communication, the non-SDT communication being received during a radio resource control (RRC) inactive state associated with the UE or an RRC idle state associated with the UE; and receiving, via the dedicated PUCCH resource set, uplink control information (UCI) associated with the second downlink communication.

Aspect 46: The method of Aspect 45, wherein transmitting the first downlink communication comprises transmitting at least one of a configuration information or an activation communication that activates the dedicated PUCCH resource set.

Aspect 47: The method of either of Aspects 45 or 46, wherein the UCI comprises a scheduling request for requesting a set of uplink resources to be used for transmitting at least one of an uplink communication, hybrid automatic repeat request (HARQ) feedback information, channel state information, link recovery request information, or early termination information associated with the SDT operation.

Aspect 48: The method of Aspect 47, wherein the uplink communication comprises at least one of a medium access control control element (MAC CE), a radio resource control (RRC) message, a mobile originated (MO) SDT (MO-SDT), a non-SDT uplink message, or a reference signal.

Aspect 49: The method of Aspect 48, wherein the MAC CE comprises at least one of a buffer status report, a power headroom report, a timing advance report, a request for activation of measurement gaps, a request for deactivation of measurement gaps, a request for network assistance information, a request for downlink reference signals, or an aperiodic channel state information report.

Aspect 50: The method of either of Aspects 48 or 49, wherein the non-SDT uplink message comprises UE assistance information.

Aspect 51: The method of any of Aspects 48-50, wherein the reference signal comprises at least one of a sounding reference signal, a physical random access channel communication, a sensing and ranging signal, or a phase tracking reference signal.

Aspect 52: The method of any of Aspects 47-51, wherein the HARQ feedback information is associated with at least one of the MT-SDT communication or a non-SDT downlink communication.

Aspect 53: The method of Aspect 52, wherein the non-SDT downlink communication comprises at least one of a downlink data communication or downlink control information (DCI).

Aspect 54: The method of Aspect 53, wherein the non-SDT downlink communication comprises at least one of a timing advance command medium access control control element, power control information, multicast-broadcast service data, positioning information, a measurement gap activation indication, a measurement gap deactivation indication, a pre-configured communication resource activation indication, a pre-configured communication resource deactivation indication, a pre-configured measurement resource activation indication, a pre-configured measurement resource deactivation indication, or upper layer control signaling information.

Aspect 55: The method of any of Aspects 45-54, wherein the first downlink communication indicates an enhancement configuration associated with the dedicated PUCCH resource set.

Aspect 56: The method of Aspect 55, wherein the enhancement configuration comprises at least one of an uplink control channel repetition configuration, a frequency hopping configuration, a demodulation reference signal bundling configuration, a waveform switching configuration, or an uplink control channel format switching configuration.

Aspect 57: The method of any of Aspects 45-56, wherein receiving the UCI comprises multiplexing the UCI with a physical uplink shared channel (PUSCH) communication, based at least on a UE capability, a timeline difference between the UCI and the PUSCH communication, or a priority of the UCI.

Aspect 58: The method of Aspect 57, wherein the PUSCH communication comprises at least one of control information or data.

Aspect 59: The method of either of Aspects 57 or 58, wherein the PUSCH communication is associated with at least one of a mobile terminated SDT (MT-SDT) communication, a mobile originated SDT communication, or a non-SDT communication.

Aspect 60: The method of any of Aspects 57-59, wherein receiving the UCI comprises multiplexing the UCI with the PUSCH communication based on a priority associated with the UCI and a priority associated with the PUSCH being equal.

Aspect 61: The method of any of Aspects 57-60, wherein receiving the UCI comprises multiplexing the UCI with the PUSCH communication based on a starting symbol associated with the dedicated uplink control channel resource set being aligned with a starting symbol associated with the PUSCH.

Aspect 62: The method of any of Aspects 45-61, further comprising: transmitting, to a user equipment (UE), a paging indication associated with an MT-SDT operation corresponding to a cell; and performing, based on receiving the paging indication, a contention based random access (CBRA) procedure associated with the cell based on the UE lacking at least one of a physical uplink shared channel configuration or a valid timing advance for uplink synchronization.

Aspect 63: The method of Aspect 62, further comprising transmitting system information indicating a common physical uplink control channel (PUCCH) resource set associated with the CBRA procedure.

Aspect 64: The method of Aspect 63, wherein the common PUCCH resource set comprises at least one of a reduced capability (RedCap) resource set or a non-RedCap resource set, based on a first initial uplink bandwidth part (BWP) and a second initial BWP being separately configured, wherein the first initial BWP corresponds to a RedCap UE type and the second initial uplink BWP corresponds to a non-RedCap UE type.

Aspect 65: The method of Aspect 64, wherein the common PUCCH resource set comprises the RedCap resource set, wherein the UE comprises a RedCap UE being separately configured with an initial uplink RedCap bandwidth part, and wherein the system information further indicates at least one of an intra-slot frequency hopping configuration or a RedCap-specific physical resource block offset.

Aspect 66: The method of any of Aspects 63-65, further comprising: receiving a radio resource control (RRC) resume request on a physical uplink shared channel (PUSCH) channel associated with the CBRA procedure; transmitting an additional downlink communication including at least a contention resolution message associated with the CBRA procedure; and receiving, using the PUCCH resource set, hybrid automatic repeat request (HARQ) feedback information in response to receiving the contention resolution message.

Aspect 67: The method of Aspect 66, wherein the CBRA procedure comprises a two-step random access channel (RACH) procedure, wherein the HARQ feedback information is associated with the contention resolution message, wherein the additional downlink communication comprises a random access response addressed to a msgB-radio network temporary identifier or a UE identifier, and wherein receiving the RRC resume request comprises receiving a msgA of the two-step RACH procedure comprising the RRC resume request.

Aspect 68: The method of any of Aspects 66-67, wherein the CBRA procedure comprises a four-step random access channel (RACH) procedure, wherein the HARQ feedback information is associated with the contention resolution message, wherein the additional downlink communication comprises a random access response addressed to a radio access radio network temporary identifier or a UE identifier, and wherein receiving the RRC resume request comprises receiving a msg3 of the four-step RACH procedure comprising the RRC resume request.

Aspect 69: The method of any of Aspects 66-68, wherein receiving the HARQ feedback information comprises receiving HARQ acknowledgement (ACK) information, and wherein transmitting the downlink communication comprises transmitting the downlink communication based on receiving the RRC resume request and the HARQ ACK information in response to the contention resolution message of the CBRA procedure.

Aspect 70: The method of any of Aspects 45-69, further comprising: transmitting, to a user equipment (UE), a paging indication associated with an MT-SDT operation corresponding to a cell; and receiving, based on transmitting the paging indication and further based on the UE being configured with a set of valid physical uplink shared channel (PUSCH) resources and a valid timing advance, a radio resource control (RRC) resume request associated with a small data transmission (SDT) operation comprising at least one of the MT-SDT operation or a mobile originated SDT (MO-SDT) operation.

Aspect 71: The method of Aspect 70, wherein receiving the RRC resume request comprises multiplexing, with an uplink communication, at least one of an RRC resume cause indication or a UE identifier (ID) associated with the MT-SDT operation or the MO-SDT operation, and wherein the uplink communication comprises an RRC message or a medium access control control element (MAC CE) carrying additional data and control information.

Aspect 72: The method of Aspect 71, wherein multiplexing, with the uplink communication, the at least one of the RRC resume cause indication or the UE ID comprises multiplexing, with the RRC message, only one RRC resume cause indication and the UE ID.

Aspect 73: The method of either of Aspects 71 or 72, wherein multiplexing, with the uplink communication, the at least one of the RRC resume cause indication or the UE ID comprises multiplexing, with the RRC message, only the UE ID.

Aspect 74: The method of any of Aspects 71-73, wherein transmitting the first downlink communication comprises transmitting the first downlink communication after receiving the at least one of the RRC resume request or the UE ID, the method further comprising receiving hybrid automatic repeat request (HARQ) feedback information using the dedicated PUCCH resource set or a common PUCCH resource set configured by system information.

Aspect 75: The method of Aspect 74, wherein receiving the HARQ feedback information comprises multiplexing the HARQ feedback information with at least one of a buffer status report, a scheduling request, or UE assistance information.

Aspect 76: The method of either of Aspects 74 or 75, wherein receiving the HARQ feedback information comprises receiving a UCI communication using the dedicated PUCCH resource set or the common PUCCH resource set, in response to transmitting the downlink communication or an additional downlink communication associated with the MT-SDT operation, the MO-SDT and non-SDT scheduled with a unique UE ID.

Aspect 77: The method of any of Aspects 74-76, wherein transmitting the first downlink communication comprises transmitting the first downlink communication based on receiving at least one of the HARQ feedback information in response to a contention resolution message of a contention based random access (CBRA) procedure using the common PUCCH resource set configured by system information, the RRC resume request, a buffer status report, or UE assistance information.

Aspect 78: The method of any of Aspects 74-77, further comprising transmitting the second downlink communication based on receiving at least one of the HARQ feedback information using the common PUCCH resource set or the dedicated PUCCH resource set, the RRC resume request, a buffer status report, or UE assistance information.

Aspect 79: The method of any of Aspects 45-78, wherein transmitting the first downlink communication comprises transmitting, from a network node associated with a cell, the first downlink communication, wherein the first downlink communication indicates at least one of a configuration of a configured grant (CG) associated with an SDT operation or an activation of the CG, the method further comprising receiving, based on the UE being configured with valid CG physical uplink shared channel (PUSCH) occasions with associated demodulation reference signal (DMRS) resources and a valid timing advance, and further based on at least one of a priority associated with the SDT operation, a size associated with the valid CG PUSCH occasions, a volume of uplink data available at one or multiple radio bearers of the UE, a reference signal received power measurement associated with the UE, a mobility status of the UE, a power saving configuration associated with the UE, or a power saving configuration associated with the network node, a radio resource control (RRC) resume request associated with a small data transmission (SDT) operation comprising at least one of a mobile terminated SDT (MT-SDT) communication, or a mobile originated SDT (MO-SDT) communication.

Aspect 80: The method of Aspect 79, wherein receiving the RRC resume request on a valid CG PUSCH occasion with an associated DMRS comprises multiplexing, with an uplink communication, at least one of an RRC resume cause indication or a UE identifier (ID) associated with the UE, and wherein the uplink communication comprises a radio resource control (RRC) message or a medium access control control element (MAC CE).

Aspect 81: The method of Aspect 80, wherein multiplexing, with the RRC message or the MAC CE, the at least one of the RRC resume cause indication or the UE ID comprises multiplexing, with the RRC message, only one RRC resume cause indication and the UE ID.

Aspect 82: The method of any of Aspects 79-81, wherein transmitting the first downlink communication comprises transmitting configuration information for a CG-SDT operation in a radio resource control (RRC) release message associated with an RRC connected state.

Aspect 83: The method of any of Aspects 79-82, wherein transmitting the first downlink communication comprises transmitting configuration information based on receiving the RRC resume request in response to transmitting a paging indication for the MT-SDT communication associated with an RRC inactive state.

Aspect 84: The method of any of Aspects 79-83, further comprising transmitting the MT-SDT communication based on receiving the RRC resume request.

Aspect 85: The method of any of Aspects 79-84, wherein receiving the RRC resume request comprises multiplexing the RRC resume request with at least one of a buffer status report or UE assistance information.

Aspect 86: The method of any of Aspects 79-85, wherein receiving the RRC resume request comprises receiving a dedicated RRC resume request message.

Aspect 87: The method of any of Aspects 79-86, further comprising transmitting, based on receiving the RRC resume request, a dynamic uplink resource grant for transmitting at least one of the UCI, a medium access control control element (MAC CE), a radio resource control message, or data information.

Aspect 88: The method of any of Aspects 79-87, further comprising: receiving a scheduling request for an uplink grant using the dedicated PUCCH resource set; and transmitting, based on receiving the scheduling request with at least one of a valid TA, an uplink grant for at least one of data information, control information, or a reference signal.

Aspect 89: An apparatus for wireless communication at a device, comprising a processor; memory coupled with the processor; and instructions stored in the memory and executable by the processor to cause the apparatus to perform the method of one or more of Aspects 1-44.

Aspect 90: A device for wireless communication, comprising a memory and one or more processors coupled to the memory, the one or more processors configured to perform the method of one or more of Aspects 1-44.

Aspect 91: An apparatus for wireless communication, comprising at least one means for performing the method of one or more of Aspects 1-44.

Aspect 92: A non-transitory computer-readable medium storing code for wireless communication, the code comprising instructions executable by a processor to perform the method of one or more of Aspects 1-44.

Aspect 93: A non-transitory computer-readable medium storing a set of instructions for wireless communication, the set of instructions comprising one or more instructions that, when executed by one or more processors of a device, cause the device to perform the method of one or more of Aspects 1-44.

Aspect 94: An apparatus for wireless communication at a device, comprising a processor; memory coupled with the processor; and instructions stored in the memory and executable by the processor to cause the apparatus to perform the method of one or more of Aspects 45-88.

Aspect 95: A device for wireless communication, comprising a memory and one or more processors coupled to the memory, the one or more processors configured to perform the method of one or more of Aspects 45-88.

Aspect 96: An apparatus for wireless communication, comprising at least one means for performing the method of one or more of Aspects 45-88.

Aspect 97: A non-transitory computer-readable medium storing code for wireless communication, the code comprising instructions executable by a processor to perform the method of one or more of Aspects 45-88.

Aspect 98: A non-transitory computer-readable medium storing a set of instructions for wireless communication, the set of instructions comprising one or more instructions that, when executed by one or more processors of a device, cause the device to perform the method of one or more of Aspects 45-88.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors coupled with the one or more memories and configured to cause the UE to:

receive a first downlink communication associated with a small data transmission (SDT) operation, the first downlink communication indicating a dedicated physical uplink control channel (PUCCH) resource set;

receive a second downlink communication during the SDT operation, the second downlink communication comprising at least one of an SDT communication or a non-SDT communication, the non-SDT communication being received during a radio resource control (RRC) inactive state associated with the UE or an RRC idle state associated with the UE; and transmit, during the SDT operation and using the dedicated PUCCH resource set, uplink control information (UCI) associated with the second downlink communication, wherein the SDT operation comprises a mobile terminated (MT) SDT (MT-SDT) operation, and wherein to transmit the UCI, the one or more processors are further configured to cause the UE to transmit the UCI during the MT-SDT operation.

2. The UE of claim 1, wherein the one or more processors, to cause the UE to receive the first downlink communication, are configured to cause the UE to receive at least one of a configuration information or an activation communication that activates the dedicated PUCCH resource set.

3. The UE of claim 1, wherein the UCI comprises a scheduling request for requesting a set of uplink resources to be used for transmitting at least one of an uplink communication, hybrid automatic repeat request (HARQ) feedback information, channel state information, link recovery request information, or early termination information associated with the SDT operation.

4. The UE of claim 1, wherein the first downlink communication indicates an enhancement configuration associated with the dedicated PUCCH resource set, wherein the enhancement configuration comprises at least one of an uplink control channel repetition configuration, a frequency hopping configuration, a demodulation reference signal bundling configuration, a waveform switching configuration, or an uplink control channel format switching configuration.

5. The UE of claim 1, wherein the one or more processors, to cause the UE to transmit the UCI, are configured to cause the UE to multiplex the UCI with a physical uplink shared channel (PUSCH) communication based at least on a UE capability, a timeline difference between the UCI and the PUSCH communication, or a priority of the UCI.

6. The UE of claim 1, wherein the one or more processors are further configured to cause the UE to:

receive, from a network node associated with a cell, a paging indication associated with the MT-SDT operation; and perform, based on receiving the paging indication, a contention based random access (CBRA) procedure associated with the cell based on the UE lacking at least one of a physical uplink shared channel configuration or a valid timing advance for uplink synchronization.

7. The UE of claim 1, wherein the one or more processors are further configured to cause the UE to:

receive, from a network node associated with a cell, a paging indication associated with the MT-SDT operation; and transmit, based on receiving the paging indication and further based on the UE being configured with a set of valid physical uplink shared channel (PUSCH) resources and a valid timing advance, an RRC resume request associated with an SDT operation comprising at least one of the MT-SDT operation or a mobile originated SDT (MO-SDT) operation.

8. The UE of claim 7, wherein the one or more processors, to cause the UE to transmit the RRC resume request, are configured to cause the UE to multiplex, with an uplink communication, at least one of an RRC resume cause indication or a UE identifier (ID) associated with the MT-SDT operation or the MO-SDT operation, and wherein the uplink communication comprises an RRC message or a medium access control control element (MAC CE) carrying additional data and control information.

9. The UE of claim 8, wherein the one or more processors, to cause the UE to multiplex, with the uplink communication, the at least one of the RRC resume cause indication or the UE ID, are configured to cause the UE to multiplex, with the RRC message, only one RRC resume cause indication and the UE ID.

10. The UE of claim 8, wherein the one or more processors, to cause the UE to multiplex, with the uplink communication, the at least one of the RRC resume cause indication or the UE ID, are configured to cause the UE to multiplex, with the RRC message, only the UE ID.

11. The UE of claim 8, wherein the one or more processors, to cause the UE to receive the first downlink communication, are configured to cause the UE to receive the first downlink communication after transmitting the at least one of the RRC resume request or the UE ID, and wherein the one or more processors are further configured to cause the UE to transmit hybrid automatic repeat request (HARQ) feedback information using the dedicated PUCCH resource set or a common PUCCH resource set configured by system information.

12. The UE of claim 11, wherein the one or more processors, to cause the UE to transmit the HARQ feedback information, are configured to cause the UE to multiplex the HARQ feedback information with at least one of a buffer status report, a scheduling request, or UE assistance information.

13. The UE of claim 11, wherein the one or more processors, to cause the UE to transmit the HARQ feedback information, are configured to cause the UE to transmit a UCI communication using the dedicated PUCCH resource set or the common PUCCH resource set, in response to receiving the first downlink communication or an additional downlink communication associated with the MT-SDT operation, the MO-SDT operation and a non-SDT scheduled with at least one of a unique UE ID or a UE group ID.

14. The UE of claim 11, wherein the one or more processors, to cause the UE to receive the first downlink communication, are configured to cause the UE to receive the first downlink communication based on transmitting at least one of the HARQ feedback information in response to a contention resolution message of a contention based random access (CBRA) procedure using the common PUCCH resource set configured by system information, the RRC resume request, a buffer status report, or UE assistance information.

15. The UE of claim 11, wherein the one or more processors are further configured to cause the UE to receive the second downlink communication based on transmitting at least one of the HARQ feedback information using the common PUCCH resource set or the dedicated PUCCH resource set, the RRC resume request, a buffer status report, or UE assistance information.

16. The UE of claim 11, wherein the one or more processors, to cause the UE to receive the first downlink communication, are configured to cause the UE to receive, from the network node, the first downlink communication, wherein the first downlink communication indicates at least one of a configuration of a configured grant (CG) associated with the SDT operation or an activation of the CG, and wherein the one or more processors are further configured to cause the UE to transmit, based on the UE being configured with valid CG physical uplink shared channel (PUSCH) occasions with associated demodulation reference signal (DMRS) resources and the valid timing advance, and further based on at least one of a priority associated with the SDT operation, a size associated with the valid CG PUSCH occasions, a volume of uplink data available at one or multiple radio bearers of the UE, a reference signal received power measurement associated with the UE, a mobility status of the UE, a power saving configuration associated with the UE, or a power saving configuration associated with the network node, the RRC resume request.

17. The UE of claim 16, wherein the one or more processors, to cause the UE to transmit the RRC resume request on a valid CG PUSCH occasion with an associated DMRS, are configured to cause the UE to multiplex, with the uplink communication, at least one of the RRC resume cause indication or a UE ID associated with the UE, and wherein the uplink communication comprises the RRC message or the MAC CE.

18. The UE of claim 16, wherein the one or more processors, to cause the UE to receive the first downlink communication, are configured to cause the UE to receive configuration information for a CG-SDT operation in an RRC release message associated with an RRC connected state.

19. The UE of claim 16, wherein the one or more processors, to cause the UE to receive the first downlink communication, are configured to cause the UE to receive the first downlink communication based on transmitting the RRC resume request in response to receiving a paging indication for the second downlink communication associated with an RRC inactive state.

20. The UE of claim 16, wherein the one or more processors are further configured to cause the UE to receive the second downlink communication based on transmitting the RRC resume request.

21. The UE of claim 16, wherein the one or more processors, to cause the UE to transmit the RRC resume request, are configured to cause the UE to multiplex the RRC resume request with at least one of a buffer status report or UE assistance information.

22. The UE of claim 16, wherein the one or more processors, to cause the UE to transmit the RRC resume request, are configured to cause the UE to transmit a dedicated RRC resume request message.

23. The UE of claim 16, wherein the one or more processors are further configured to cause the UE to receive, based on transmitting the RRC resume request, a dynamic uplink resource grant for transmitting at least one of the UCI, the MAC CE, the RRC message, or data information.

24. The UE of claim 16, wherein the one or more processors are further configured to cause the UE to:

transmit a scheduling request for an uplink grant using the dedicated PUCCH resource set; and receive, based on transmitting the scheduling request with the valid timing advance, the uplink grant, wherein the uplink grant is for at least one of data information, the control information, or a reference signal.

25. The UE of claim 1, wherein the non-SDT communication comprises at least one of a timing advance command medium access control control element (MAC CE), power control information, multicast-broadcast service data, positioning information, a measurement gap activation indication, a measurement gap deactivation indication, a pre-configured communication resource activation indication, a pre-configured communication resource deactivation indication, a pre-configured measurement resource activation indication, a pre-configured measurement resource deactivation indication, or upper layer control signaling information.

26. A network node for wireless communication, comprising:

one or more memories; and one or more processors coupled with the one or more memories and configured to cause the network node to:

transmit, to a user equipment (UE), a first downlink communication associated with a small data transmission (SDT) operation, the first downlink communication indicating a dedicated physical uplink control channel (PUCCH) resource set;

transmit a second downlink communication during the SDT operation, the second downlink communication comprising at least one of an SDT communication or a non-SDT communication, the non-SDT communication being transmitted during a radio resource control (RRC) inactive state associated with the UE or an RRC idle state associated with the UE; and receive, during the SDT operation and via the dedicated PUCCH resource set, uplink control information (UCI) associated with the second downlink communication, wherein the SDT operation comprises a mobile terminated (MT) SDT (MT-SDT) operation, and wherein to receive the UCI, the one or more processors are further configured to cause the network node to receive the UCI during the MT-SDT operation.

27. The network node of claim 26, wherein the one or more processors, to cause the network node to transmit the first downlink communication, are configured to cause the network node to transmit at least one of a configuration information or an activation communication that activates the dedicated PUCCH resource set.

28. A method of wireless communication performed by a user equipment (UE), comprising:

receiving a first downlink communication associated with a small data transmission (SDT) operation, the first downlink communication indicating a dedicated physical uplink control channel (PUCCH) resource set;

receiving a second downlink communication during the SDT operation, the second downlink communication comprising at least one of an SDT communication or a non-SDT communication, the non-SDT communication being received during a radio resource control (RRC) inactive state associated with the UE or an RRC idle state associated with the UE; and transmitting, during the SDT operation and using the dedicated PUCCH resource set, uplink control information (UCI) associated with the second downlink communication, wherein the SDT operation comprises a mobile terminated (MT) SDT (MT-SDT) operation, and wherein transmitting the UCI comprises transmitting the UCI during the MT-SDT operation.

29. The method of claim 28, wherein receiving the first downlink communication comprises receiving at least one of a configuration information or an activation communication that activates the dedicated PUCCH resource set.

30. A method of wireless communication performed by a network node, comprising:

transmitting, to a user equipment (UE), a first downlink communication associated with a small data transmission (SDT) operation, the first downlink communication indicating a dedicated physical uplink control channel (PUCCH) resource set;

transmitting a second downlink communication during the SDT operation, the second downlink communication comprising at least one of an SDT communication or a non-SDT communication, the non-SDT communication being transmitted during a radio resource control (RRC) inactive state associated with the UE or an RRC idle state associated with the UE; and receiving, during the SDT operation and via the dedicated PUCCH resource set, uplink control information (UCI) associated with the second downlink communication, wherein the SDT operation comprises a mobile terminated (MT) SDT (MT-SDT) operation, and wherein receiving the UCI comprises receiving the UCI during the MT-SDT operation.

* * * * *